US009697697B2

(12) United States Patent
Singleton et al.

(10) Patent No.: US 9,697,697 B2
(45) Date of Patent: Jul. 4, 2017

(54) CARD GAME

(71) Applicant: CFPH, LLC, New York, NY (US)

(72) Inventors: Quinton Singleton, Las Vegas, NV (US); Joshua Hanson, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 14/231,469

(22) Filed: Mar. 31, 2014

(65) Prior Publication Data

US 2015/0221184 A1 Aug. 6, 2015

Related U.S. Application Data

(60) Provisional application No. 61/936,792, filed on Feb. 6, 2014.

(51) Int. Cl.

| | |
|---|---|
| ***G06F 17/00*** | (2006.01) |
| ***G06F 19/00*** | (2011.01) |
| ***G07F 17/32*** | (2006.01) |
| *A63F 1/00* | (2006.01) |

(52) U.S. Cl.

CPC ............ *G07F 17/3293* (2013.01); *A63F 1/00* (2013.01); *A63F 2001/005* (2013.01)

(58) Field of Classification Search

CPC ... G07F 17/3293; A63F 1/00; A63F 2001/005

USPC ....................................... 463/11-13; 273/292

See application file for complete search history.

(56) References Cited

U.S. PATENT DOCUMENTS 4,515,367 A 5/1985 Howard
4,836,553 A 6/1989 Suttle et al.
4,861,041 A 8/1989 Jones et al.
5,000,453 A 3/1991 Stevens et al.
5,022,653 A 6/1991 Suttle et al.
5,326,104 A 7/1994 Pease et al.
5,356,140 A 10/1994 Dabrowski et al.
5,437,451 A 8/1995 Fulton
(Continued)

FOREIGN PATENT DOCUMENTS

WO WO 01/54091 7/2001
WO WO 2005/082011 9/2005

OTHER PUBLICATIONS

Notification of Transmittal of the International Search Report and the Written Opinion of the International Searching Authority for Application No. PCT/US15/014847 mailed Feb. 26, 2015 (11 pages).

(Continued)

*Primary Examiner* — Milap Shah

(74) *Attorney, Agent, or Firm* — Thomas D. Bradshaw

(57) ABSTRACT

"n" cards of a first hand may be dealt. None to all of the n cards may be discarded. When card(s) are discarded, card(s) may be drawn to complete the first hand to have n cards to form a final first hand. The final first hand may be duplicated to a second hand of n cards, or card(s) may be selected from the final first hand to duplicate to a second hand and additional card(s) drawn to have n cards. None to all of the n cards of the second hand may be discarded. When card(s) are discarded, card(s) may be drawn to complete the second hand to have n cards to form a final second hand. A determination of whether the final first and second hands are winning hands may be made.

30 Claims, 22 Drawing Sheets

(56) References Cited

U.S. PATENT DOCUMENTS 5,505,461 A 4/1996 Bell et al.
5,732,950 A 3/1998 Moody
5,810,663 A 9/1998 Bochichio et al.
5,816,914 A 10/1998 Wichinsky
5,816,915 A 10/1998 Kadlic
5,823,873 A * 10/1998 Moody .......... 463/13
5,868,619 A 2/1999 Wood et al.
5,941,769 A 8/1999 Order
6,007,066 A 12/1999 Moody
6,048,267 A 4/2000 Wichinsky
6,093,103 A 7/2000 McCrea, Jr.
6,098,985 A 8/2000 Moody
6,129,357 A 10/2000 Wichinsky
6,132,311 A 10/2000 Williams
6,159,095 A 12/2000 Frohm et al.
6,299,536 B1 10/2001 Hill
6,312,333 B1 11/2001 Acres
6,435,509 B2 8/2002 Wichinsky
6,474,645 B2 * 11/2002 Tarantino .......... 273/274
6,579,181 B2 6/2003 Soltys et al.
6,585,587 B2 * 7/2003 Falciglia, Sr. .......... 463/13
6,612,927 B1 * 9/2003 Slomiany et al. .......... 463/16
6,666,768 B1 12/2003 Akers
6,669,198 B2 12/2003 Wichinsky
6,837,791 B1 1/2005 McNutt et al.
7,114,718 B2 10/2006 Grauzer et al.
7,137,629 B2 11/2006 Chapman
7,137,630 B2 11/2006 Yurkins
7,416,186 B2 * 8/2008 Walker et al. .......... 273/292
7,559,838 B2 7/2009 Walker et al.
7,597,327 B2 * 10/2009 Dodge .......... 273/292
7,704,136 B2 * 4/2010 Shackleford et al. .......... 463/13
7,707,093 B2 4/2010 O'Shaughnessy et al.
7,740,533 B2 * 6/2010 Walker et al. .......... 463/13
7,771,271 B2 8/2010 Walker et al.
8,210,931 B2 7/2012 Alderucci et al.
8,814,645 B1 8/2014 Hanson
2001/0015528 A1 * 8/2001 Wichinsky et al. .......... 273/292
2002/0082076 A1 6/2002 Roser et al.
2002/0111815 A1 8/2002 Smith
2002/0132657 A1 9/2002 Matthiesen
2002/0149153 A1 * 10/2002 Wichinsky .......... 273/292
2002/0185816 A1 12/2002 Moody et al.
2003/0003997 A1 1/2003 Vuong et al.
2003/0022719 A1 1/2003 Donald et al.
2004/0053663 A1 3/2004 Paulsen et al.
2004/0110554 A1 6/2004 Bromfield
2004/0229671 A1 11/2004 Stronach et al.
2004/0242319 A1 12/2004 Walker et al.
2005/0012269 A1 1/2005 Grauzer et al.
2005/0153774 A1 7/2005 Okada
2005/0170884 A1 8/2005 Okada
2006/0205494 A1 9/2006 Fujimoto
2007/0099696 A1 5/2007 Nguyen et al.
2008/0039189 A1 2/2008 Walker et al.
2008/0070700 A1 3/2008 Inamura
2008/0188278 A1 8/2008 Paulsen et al.
2008/0242392 A1 10/2008 Inamura
2009/0061975 A1 * 3/2009 Ditchev .......... 463/13
2009/0176558 A1 7/2009 Englman et al.
2009/0239631 A1 * 9/2009 Aoki .......... G07F 17/34
463/20
2010/0105459 A1 4/2010 Miller
2011/0095480 A1 * 4/2011 Berman et al. .......... 273/292
2012/0122555 A1 5/2012 Schneider
2012/0190433 A1 7/2012 Rowe
2012/0322526 A1 * 12/2012 Berman et al. .......... 463/13
2014/0038681 A1 2/2014 Paulsen et al.
2015/0187176 A1 7/2015 Amaitis
2015/0213688 A1 7/2015 Hanson

OTHER PUBLICATIONS

U.S. Notice of Allowance for U.S. Appl. No. 14/163,686; Jun. 11, 2014; 9 pages.
Notification of Transmittal of the International Search Report and the Written Opinion of the International Searching Authority for Application No. PCT/US15/012617 mailed Apr. 13, 2015 (8 pages).
U.S. Appl. No. 14/231,469, filed Mar. 31, 2014, Singleton, et al.
Notification of Transmittal of the International Search Report and the Written Opinion of the International Searching Authority for Application No. PCT/US2014/072529 mailed Apr. 22, 2015 (7 pages).
U.S. Appl. No. 61/921,409, filed Dec. 28, 2013, Amaitis et al.
U.S. Appl. No. 61/936,792, filed Feb. 6, 2014, Hanson.
PCT International Search Report and Written Opinion for Application No. PCT/US2008/079476; Dec. 8, 2008; 10 pages.
US Notice of Allowance and Fees Due for U.S. Appl. No. 11/871,403 mailed Feb. 28, 2012 (11 pages).
USPTO Office Action for U.S. Appl. No. 13/540,128 mailed Jun. 17, 2014 (10 pages).
"The Proof is in the Papers" Documenting gambling losses for tax purposes. Casino Player Magazine by Frank Sutherland, CPA https://web.archive.org/web/20010306063334/http://www.casinoplayer.com/archive/9603cp/taxes.html. Retrieved Oct. 30, 2015.
Notification Concerning Transmittal of International Preliminary Report on Patentability for Application No. PCT/US2014/072529 mailed Jul. 7, 2016 (6 pages).

* cited by examiner

CARD GAME

RELATED APPLICATIONS

This application claims the benefit of U.S. Provisional Application No. 61/936,792, filed Feb. 6, 2014, the contents of which are hereby incorporated by reference herein in their entirety.

BACKGROUND

Various types of card games are known.

SUMMARY

According to an example embodiment, a method may include, dealing a plurality of "n" cards of a first hand, wherein the n cards are displayed face up; receiving a selection of as few as none and as many as all of the n cards of the first hand as cards to be held, wherein any card not selected to be held is discarded from the first hand; when one or more cards are discarded from the first hand, drawing one or more cards to complete the first hand to have n cards to form a final first hand; duplicating by at least one processor the final first hand of n cards to a second hand of n cards, wherein the n cards duplicated to the second hand are displayed face up; receiving a selection of as few as none and as many as all of the n cards of the second hand as cards to be held, wherein any card not selected to be held is discarded from the second hand; when one or more cards are discarded from the second hand, drawing one or more cards to complete the second hand to have n cards to form a final second hand; determining whether the final first hand is a winning hand or a losing hand; and determining whether the final second hand is a winning hand or a losing hand.

According to another example embodiment, a method may include, dealing a plurality of "n" cards of a first hand, wherein the n cards are displayed face up; receiving a selection of as few as none and as many as all of the n cards of the first hand as cards to be held, wherein any card not selected to be held is discarded from the first hand; when one or more cards are discarded from the first hand, drawing one or more cards to complete the first hand to have n cards to form a final first hand; receiving a selection of as few as none and as many as all of the n cards of the final first hand as cards to be duplicated to a second hand; when one or more cards are selected from the final first hand to be duplicated to the second hand, duplicating the selected cards from the final first hand to the second hand, wherein the cards duplicated to the second hand are displayed face up; when fewer than n cards are duplicated from the final first hand to the second hand, drawing one or more cards to complete the second hand to have n cards; receiving a selection of as few as none and as many as all of the n cards of the second hand as cards to be held, wherein any card not selected to be held is discarded from the second hand; when one or more cards are discarded from the second hand, drawing one or more cards to complete the second hand to have n cards to form a final second hand; determining whether the final first hand is a winning hand or a losing hand; and determining whether the final second hand is a winning hand or a losing hand.

The above advantages and features are of representative embodiments only, and are presented only to assist in understanding the invention. They are not to be considered limitations on the invention as defined by the claims. Additional features and advantages of embodiments of the invention will become apparent in the following description, from the drawings, and from the claims.

DESCRIPTION

Figure 1A:
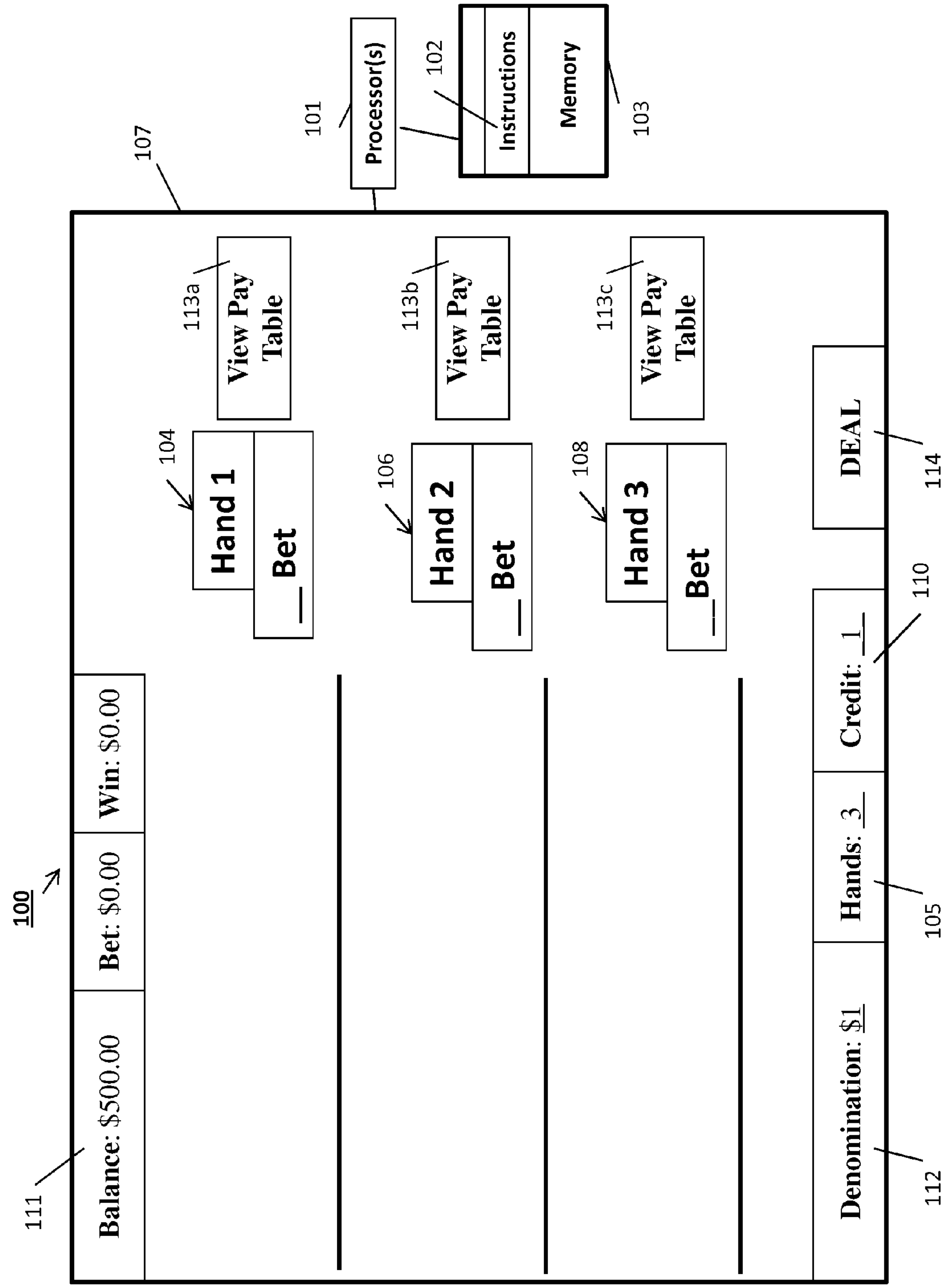
FIGS. 1A-1J show an example play of an example card game.

Various embodiments disclosed herein relate to games played with cards. The games may be played with a standard deck of cards—in other words, for example, a deck with fifty-two cards consisting of four suits/symbols (diamonds, hearts, spades, and clubs), with each suit having an ace through ten, jack, queen, and king. The games may also be played with cards having suits or symbols other than diamonds, hearts, spades, and/or clubs, and with values other than ace through ten, jack, queen, and king. The games may also be played with a deck of cards having less than fifty-two cards—for example, a deck without deuces. The games may also be played with a deck of cards having more than fifty-two cards—for example, a deck that includes fifty-two cards plus one or more wild cards (i.e., cards that can have any suite and/or any value). The games may also be played with multiple decks of cards, each deck consisting of any number of cards. The games may also be played with a deck(s) of cards where one or more cards may have one or more suits and/or values (e.g., a deuce may have the value two and also be a wild card). Other variations are possible.

The games disclosed herein may be played with physical cards, such as at a table, and/or with virtual cards or in other words, cards as may be presented by a computing device on a display screen, for example.

The games disclosed herein:

- may be single player/user where the determination of whether a player wins or loses may be based on a set of rules applied to the player's hand(s);
- may be single player against a house entity, for example, where the determination of whether a player wins or loses may be based on a set of rules and a comparison of the player's hand(s) against a house's hand(s);
- may be multiplayer where each player plays against himself such that the determination of whether a given player wins or loses may be based on a set of rules applied to that player's hand(s);
- may be multiplayer where the determination of whether a given player wins or loses may be based on a set of rules and a comparison of a given player's hand(s) against one or more other players' hand(s); and/or
- may be multiplayer where each player plays against a house and where the determination of whether a given player wins or loses may be based on a set of rules and a comparison of a given player's hand(s) against the house's hand(s). Other variations are possible.

When multiplayer and/or against a house, cards dealt to each player and/or house may come from a common deck(s) of cards. As another and/or additional variation, each player and/or house may be dealt cards from a deck(s) of cards specific to that player/house. Other variations are possible.

As indicated, the games discussed herein may be played with virtual cards and thereby played on a computing device(s). For example, a player may play the games on a standalone player device (such as a kiosk, a computer, a laptop, a tablet, a phone, etc.) that includes for example, one or more processors 101 that execute one or more hardware and/or software instructions 102 (e.g., instructions that may be stored on one more tangible/nontransitory computer-readable memory devices 103). Such instructions, when executed, may provide the games disclosed herein. Such a player device may include one or more output devices for a player/user to play a game (such as a display screen(s) 107 and/or audio device(s)), and/or one or more input devices (such a physical button(s), a mouse, track ball, a touch sensitive screen(s), microphone, etc). Such a player device may also include one or more input/output devices to enter wagers and/or receive winnings such as a coin or bill receiver/dispenser, a card reader to read a credit card, debit card, loyalty card, a ticket-in-ticket-out device, etc. A player device may also include other input/output devices.

As another example, the games disclosed herein may be provided on a client/server type platform, for example, where a player interfaces with a player device, such as kiosk, computer, laptop, tablet, phone, etc., that may include one or more input/output devices as discussed above. Such a player device may further communicate via one or more networks with one or more computing servers that support, for example, a plurality of player devices. Such a server(s) may include for example one or more processors 101 that execute one or more hardware and/or software instructions 102 (e.g., instructions that are stored on one more tangible/nontransitory computer-readable memory devices 103). Such instructions, when executed, may provide the games disclosed herein. For example, a player may enter commands at a player device, which commands may be communicated to the server(s) which in turn may execute the commands in accordance with games disclosed herein. Similarly, the server(s), in providing the games, may cause a player device to display game events to a player, such as display cards. One skilled in the art will recognize that these are merely examples and that other variations are possible, including both the server(s) and a player device storing and/or executing instructions to provide the games. The games disclosed herein will be described as virtual games, in other words, provided via a computing system. Again, such games may also be played via physical cards for example. Other variations are possible including the games being conducted at tables, for example, with physical cards and player(s) interacting with the cards via a player device(s) (e.g., virtual cards representing actual cards being played at a table may be shown to a player via a player device).

Xtra Draw Poker

Referring now to FIG. 1A there is shown an example game 100. For example purposes, game 100 will be described as a single player game where the determination of whether a player wins or loses the game may be based on a set of rules applied to the player's hand(s). According to example game 100, a player may choose to play a plurality of hands of cards, such as one, two, or more hands, by entering for example a value in "Hands" field 105. In this example, three hands have been selected, which are represented by hands 104, 106, and 108. In this example, the player has three separate opportunities to win as represented by hands 104, 106, and 108 as further described herein. If the player had selected to play two hands, for example, the player may have two opportunities to win (e.g., Hand 3 would not be shown), and if the player had selected to play four hands, for example, the player may have four opportunities to win (e.g., a Hand 4 may be shown), etc. Other variations are possible including, for example, the determination of whether a player wins or loses being based on the player having to win all three hands, at least two hands, etc.

According to this example, a player may also place a wager on each of hands 104, 106, and 108. The amount wagered may be the same amount or a different amount for each hand. According to this example, the player may wager the same amount on each hand. Here, the player makes a wager by entering a value in "Credit" field 110 (here one credit), where each credit has a value as specified by the player entering a value in "Denomination" field 112 (here one dollar). As shown in this example, the player has an account balance of $500 as shown by "Balance" field 111 to which to play the game. Other variations of entering wagering amounts are possible, including wagering points, for example, rather than monetary amounts. The games disclosed herein may also be played for fun, where a player wagers nothing and wins nothing, wagers nothing and wins prizes, etc.

According to game 100, the determination of whether a given hand 104, 106, or 108 is a winning or losing hand may be based on a "complete" hand of "n" cards, which in this example, is five cards (i.e., n=5). Nonetheless, a complete hand of cards may consist of any plurality on "n" cards including less than five cards or more than five cards. Similarly, each of hands 104, 106, or 108 for example may use a different number of cards to constitute a complete hand of cards. In this example, five cards make a complete hand for each of hands 104,106, and 108.

According to game 100, the rules used to determine whether any of hands 104, 106, and 108 is a winning hand may be poker based rules. Other rules may also be used including one or more of hands 104, 106, and 108 each using different rules. An example of poker based rules that may result in a winning hand may be (a) a royal flush, (b) a straight flush, (c) four of a kind, (d) a full house, (e) a flush, (f) a straight, (g) three of a kind, or (h) two pair. Any other combination of cards may be viewed as a losing hand. Other poker based rules may be used to determine a winning hand. Other and/or additional rules in general may also be used.

According to game 100, a pay table may be applied to each of hands 104, 106, and 108. The pay table may include payout rates that may be used to determine the amount a player wins when the player has a winning hand. For example, assuming a player wagers "x" credits on a given hand, a pay table may be used to determine the amount the player wins (payout) when the hand consists of (a) a royal flush, (b) a straight flush, (c) four of a kind, (d) a full house, (e) a flush, (f) a straight, (g) three of a kind, or (h) two pair. As an example, a pay table may consist of (a) a royal flush having the highest pay rate, (b) a straight flush having the next highest pay rate, (c) four of a kind having the next highest pay rate, (d) a full house having the next highest pay rate, (e) a flush having the next highest pay rate, (f) a straight having the next highest pay rate, (g) three of a kind having the next highest pay rate, and (h) two pair having the lowest pay rate. Other pay tables may be used. According to one example, a player may be paid only once according to the highest pay rate that applies to a given hand. The pay table applied to each of hands 104, 106, 108, etc. may be the same (i.e., have the same pay rates) or may differ (i.e., have one or more different pay rates) for one or more hands. According to one example, the pay table for hand 104 may have the highest pay rates, the pay table for hand 106 may have the next highest pay rates, and the pay table for hand 108 may have the lowest pay rates, etc. Hence, assuming a player wagers one credit on each of hands 104, 106, and 108 and achieves for each of these hands a royal flush, the player may be paid the most for hand 104, the next most for hand 106, and the least for hand 108. Other pay tables/pay rates may be used. For example, the pay table for hand 108 may have the highest pay rates, the pay table for hand 106 may have the next highest pay rates, and the pay table for hand 104 may have the lowest pay rates, etc. As shown in FIG. 1A, one or more "View Pay Table" options 113*a-c* may be available for selection by a player to view respective pay table(s) for each of hands 104, 106, and 108. As another example, a single "View Pay Table" option may be provided that provides payouts for each of the hands. Other variations are possible.

Figure 1B:
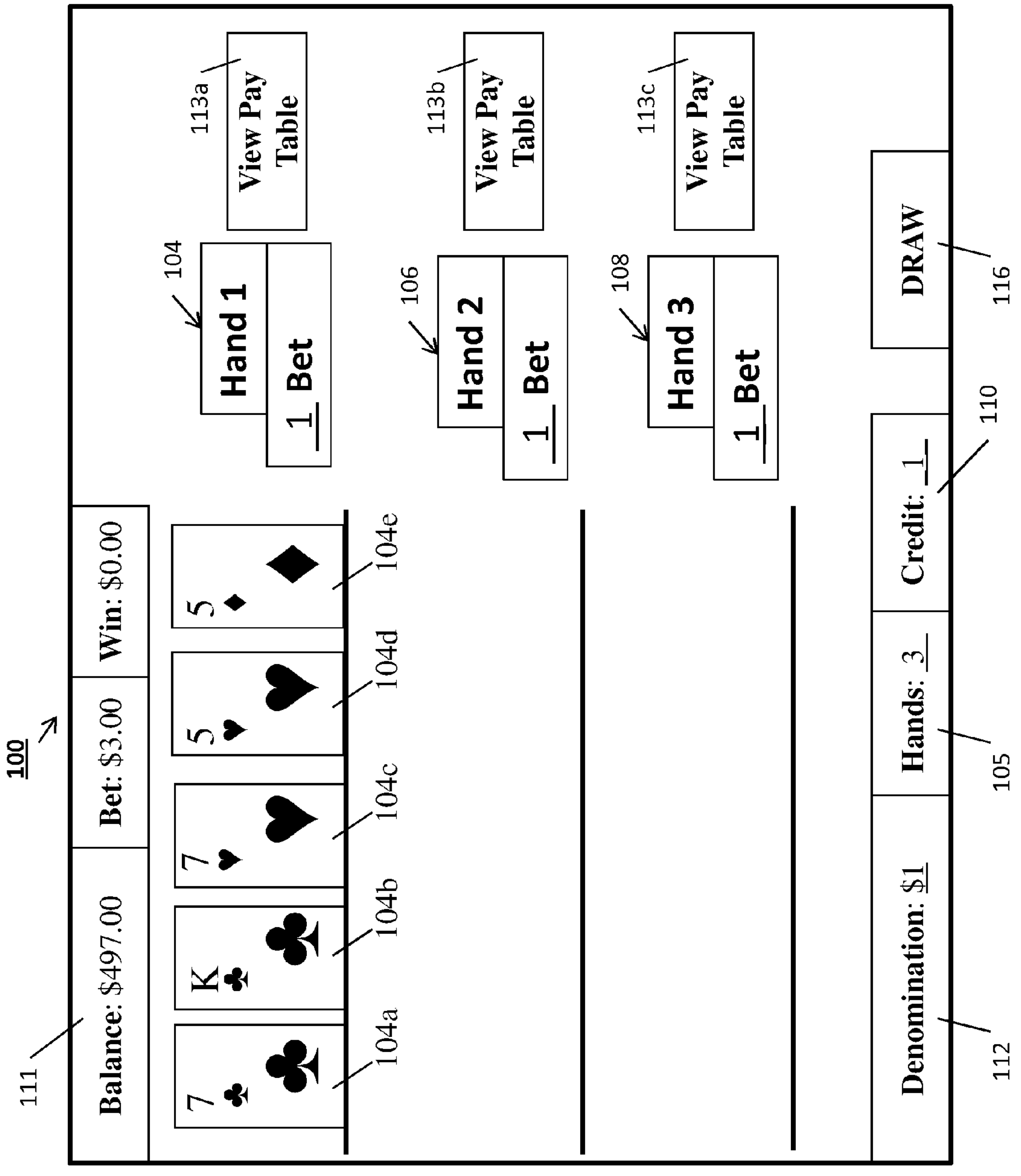
Figure 1C:
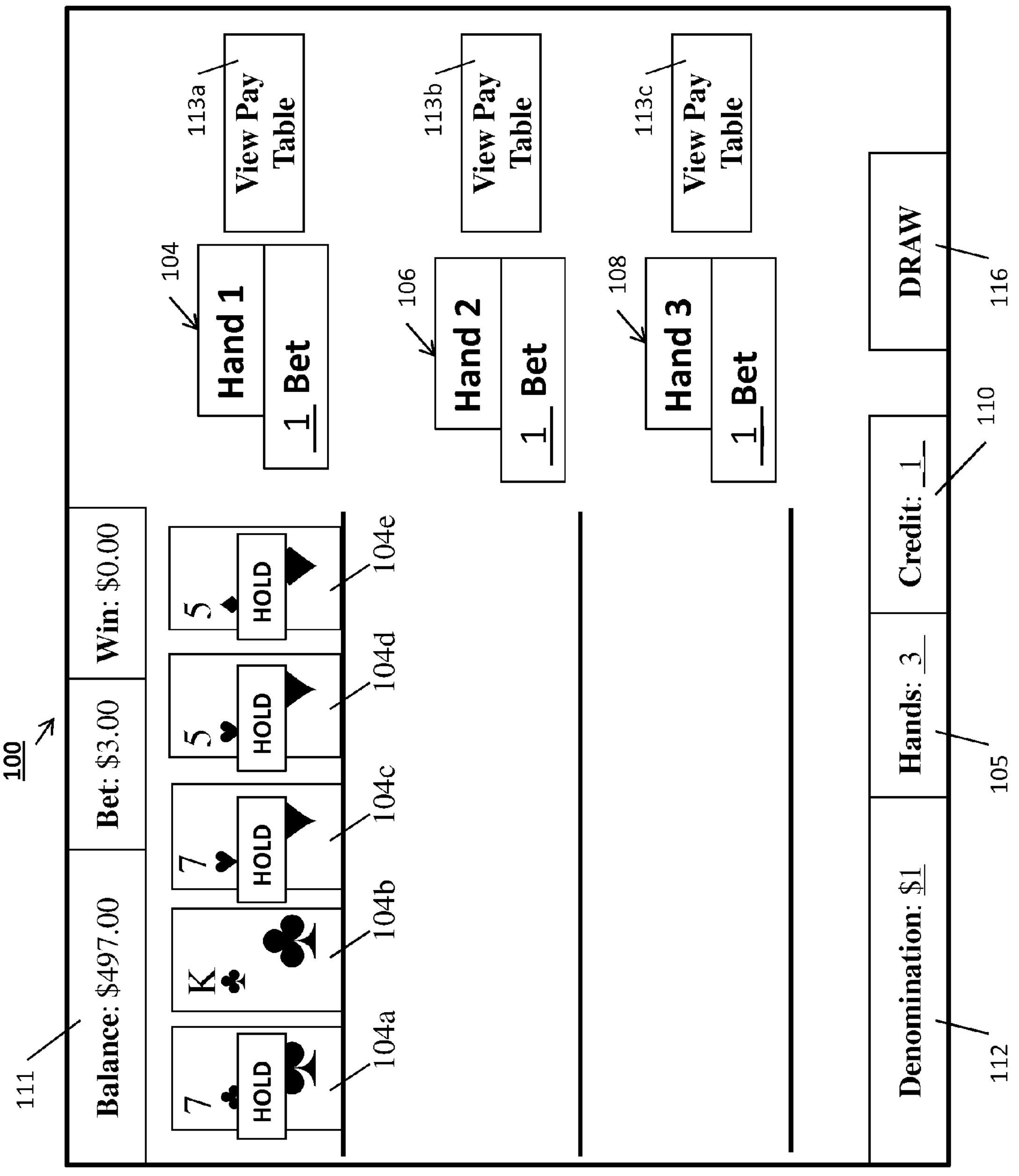

Referring further to an example operation of game 100, a player (after selecting the number of hands and possibly wager amount(s), for example) may select "Deal" button/option 114 (the word "deal" as used herein is merely example and other words, such as "draw" may be used to indicate the action of a player selecting card(s) from a deck/having cards drawn from a deck). Deal button 114 may result in a plurality of cards being drawn from a first deck of cards and displayed face up to the player in hand 104 (see FIG. 1B). In this example, hand 104 consists of five cards (represented by positions 104*a-e*), which makes a complete hand of n=5 cards. Again, five cards are merely an example. In this example, hand 104 consists of a seven of clubs (104*a*), a king of clubs (104*b*), a seven of hearts (104*c*), a five of hearts (104*d*), and a five of diamonds (104*e*). A player may next select one or more of cards 104*a-e* to hold including selecting all of the cards to hold or none of the cards to hold. In selecting one or more cards to hold, a player may be viewed as effectively selecting one or more cards to discard. Hence, selecting cards to "hold" may be accomplished for example by a player selecting the cards the player wishes to hold or the player selecting the cards the player wishes to discard. If selecting cards to discard, such cards may disappear from hand 104 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (104*a*), the seven of hearts (104*c*), the five of hearts (104*d*), and the five of diamonds (104*e*) as shown by FIG. 1C.

Figure 1D:
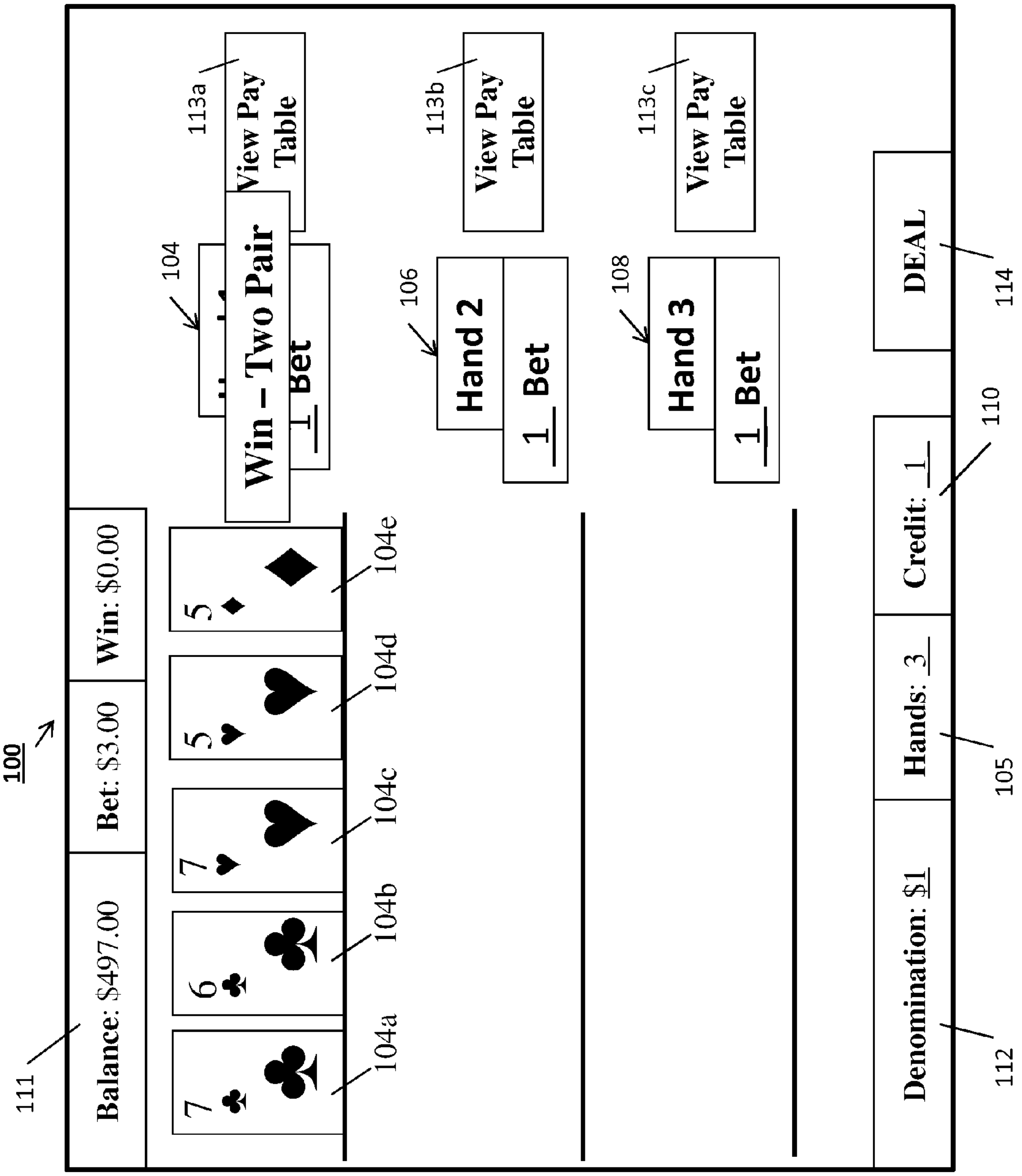

A player may next select "Draw" button/option 116 (the word "draw" is merely an example and other words such as "deal" may be used to indicate the action of a player selecting card(s) from a deck/having cards drawn from a deck). As shown in FIG. 1D, draw button 116 may result in non-held card(s) (here card 104*b*) disappearing from hand 104 (assuming the card(s) have not already disappeared), additional card(s) being drawn from the first deck to complete hand 104 to five cards (thereby forming a final hand), and the additional drawn card(s) being displayed to the player. In this example, a six of clubs has been drawn from the first deck and displayed to the player in position 104*b*. Once additional cards have been drawn from the first deck to complete hand 104 to a final hand, a determination may be made based on the final hand of cards as to whether hand 104 is a winning hand. This determination may also be made at another time, such as after the completion of each of hands 104, 106, and 108. Assuming the determination is made now, an indication may be displayed to the player such as "win" or "lose". If hand 104 is a winning hand, and rules of poker are applied to the hand to make this determination, for example, the type of winning hand (here, two pair) may also be displayed to the player. In addition, the amount the player has won and/or the pay rate may also be indicated to the player.

Figure 1E:
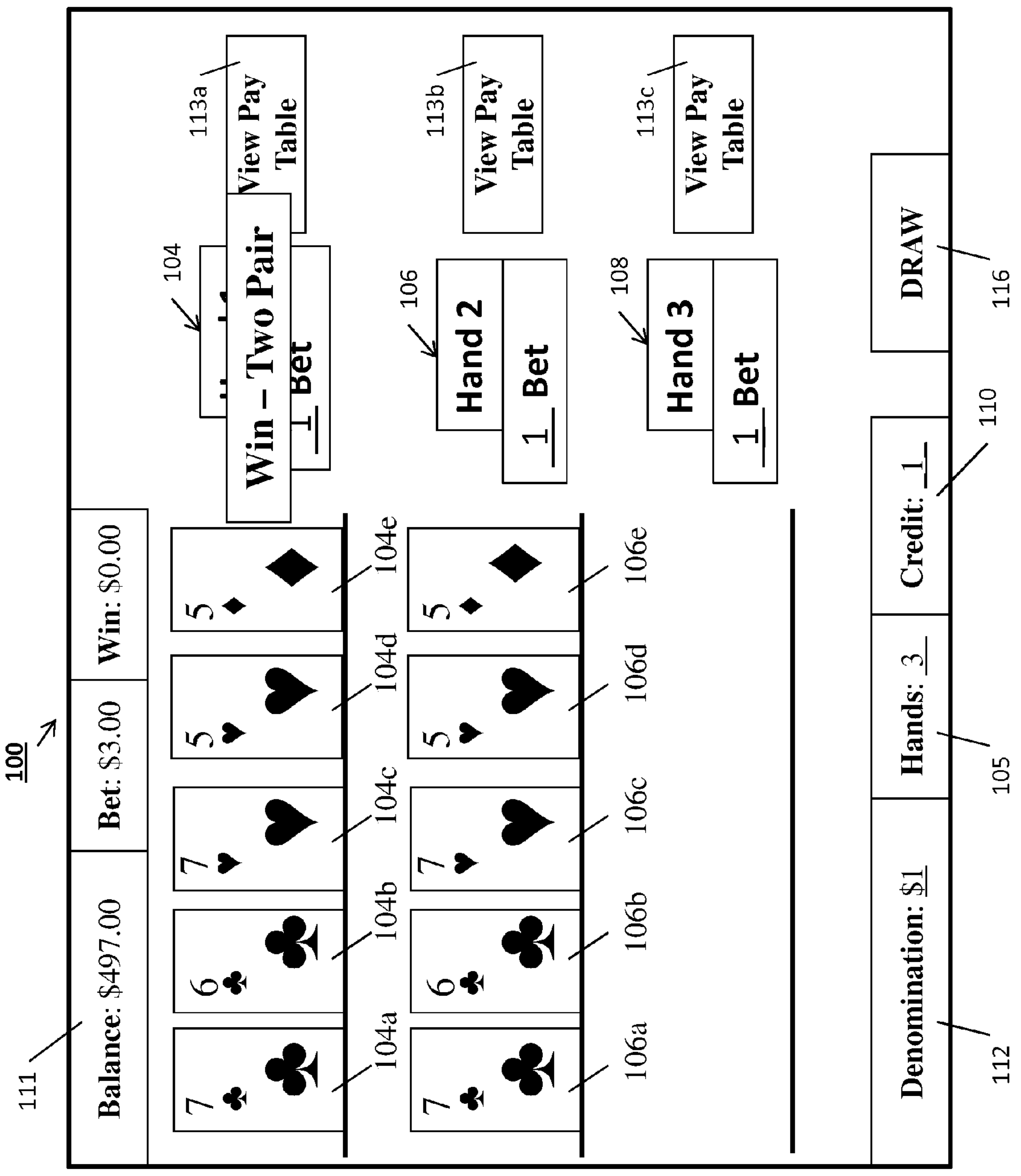

According to a further example operation of game 100, a player may again select "Deal" button/option 114. The selection of the button 114 may result in the cards of final hand 104 being copied/duplicated to hand 106, as shown in FIG. 1E, thereby indicating the start of hand 106. As another example, the selection of draw button 116 with respect to hand 104 may not only result in cards being drawn from the first deck to complete hand 104, but the cards of completed hand 104 being copied/duplicated to hand 106, thereby indicating the start of hand 106. Other variations are possible. Hence, in this example, hand 106 may start with a seven of clubs (106*a*), a six of spades (106*b*), a seven of hearts (106*c*), a five of hearts (106*d*), and a five of diamonds (106*e*). Note, for example, that if a player had chosen not to discard any cards originally dealt to hand 104, the win-loss determination of hand 104 may have been made on the seven of clubs (104*a*), the king of clubs (104*b*), the seven of hearts (104*c*), the five of hearts (104*d*), and the five of diamonds (104*e*), and these cards being copied/duplicated to hand 106 as the start of hand 106. Other variations are possible.

Returning to the present example, the first deck of cards used for hand 104 may be discarded with the start of hand 106, with a new second deck of cards being used for hand 106. Hence, this second deck may be viewed as having the seven of clubs (106*a*), the six of clubs (106*b*), the seven of hearts (106*c*), the five of hearts (106*d*), and the five of diamonds (106*e*) dealt from it. In addition, the king of clubs, which was dealt from the first deck with respect to hand 104, may be part of the second deck. As another example, the deck of cards used for hand 106 may be the same deck of cards as used for hand 104. Hence, once completed hand 104 is copied/duplicated to hand 106, the status of the deck used for hand 104 may be the starting point for hand 106. Here, for example, the king of clubs, which was dealt from the first deck with respect to hand 104, may not be part of the deck. Other variations are possible.

Figure 1F:
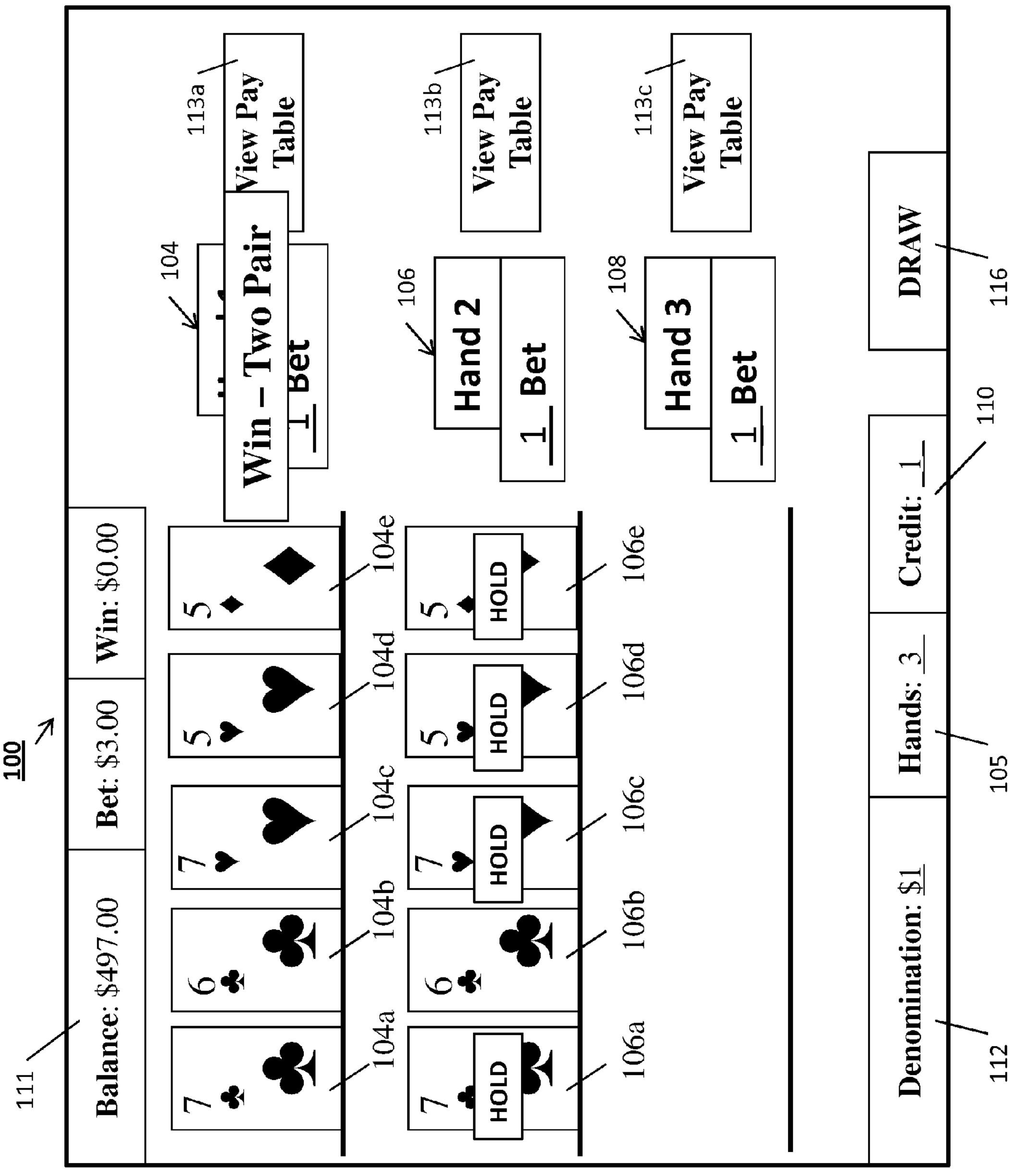

Similar to hand 104, a player may next select one or more of cards 106*a-e* of hand 106 to hold including selecting all of the cards to hold or none of the cards to hold (or viewed alternatively, one or more cards to discard). Hence, selecting cards to "hold" may be accomplished for example by a player selecting the cards the player wishes to hold or the player selecting the cards the player wishes to discard. If selecting cards to discard, such cards may disappear from hand 106 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (106*a*), the seven of hearts (106*c*), the five of hearts (106*d*), and the five of diamonds (106*e*), thereby discarding the six of clubs (106*b*) as shown by FIG. 1F.

Figure 1G:
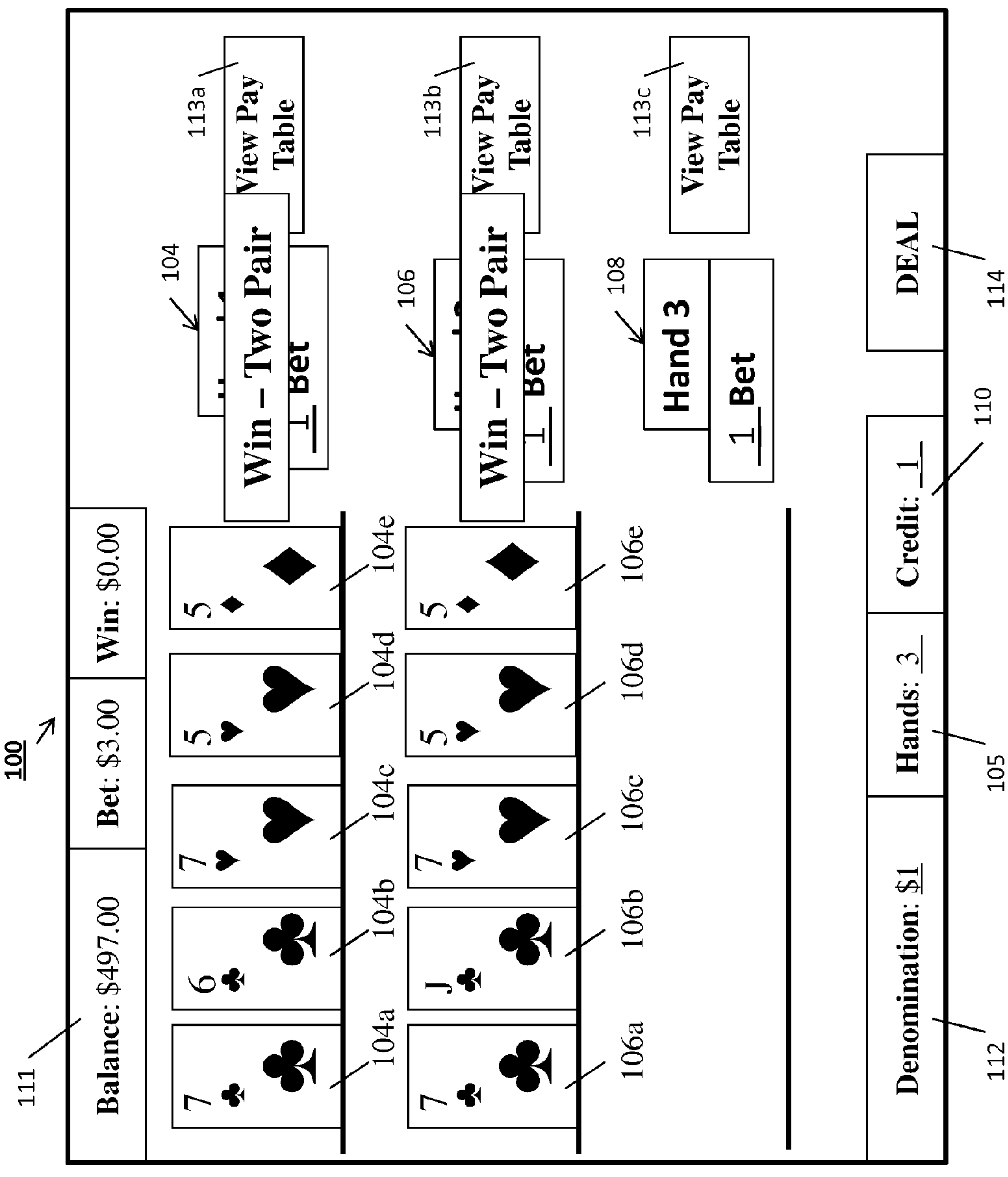

A player may next select "Draw" button 116. As shown in FIG. 1G, draw button 116 may result in non-held card(s) (here card 106*b*) disappearing from hand 106 (assuming the card(s) have not already disappeared), additional card(s) being drawn from the second deck to complete hand 106 to five cards (thereby forming a final hand), and the additional drawn card(s) being displayed to the player. In this example, a jack of clubs has been drawn from the second deck and displayed to the player in position 106*b*. Once additional cards have been drawn from the second deck to complete hand 106 to a final hand, a determination may be made based on the final hand of cards as to whether hand 106 is a winning hand. This determination may also be made at another time, such as after the completion of each of hands 106 and 108. Assuming the determination is made now, an indication may be displayed to the player such as "win" or "lose". If hand 106 is a winning hand, and rules of poker are applied to the hand to make this determination, for example, the type of winning hand (here, two pair) may also be displayed to the player. In addition, the amount the player has won and/or the pay rate may also be indicated to the player.

Figure 1H:
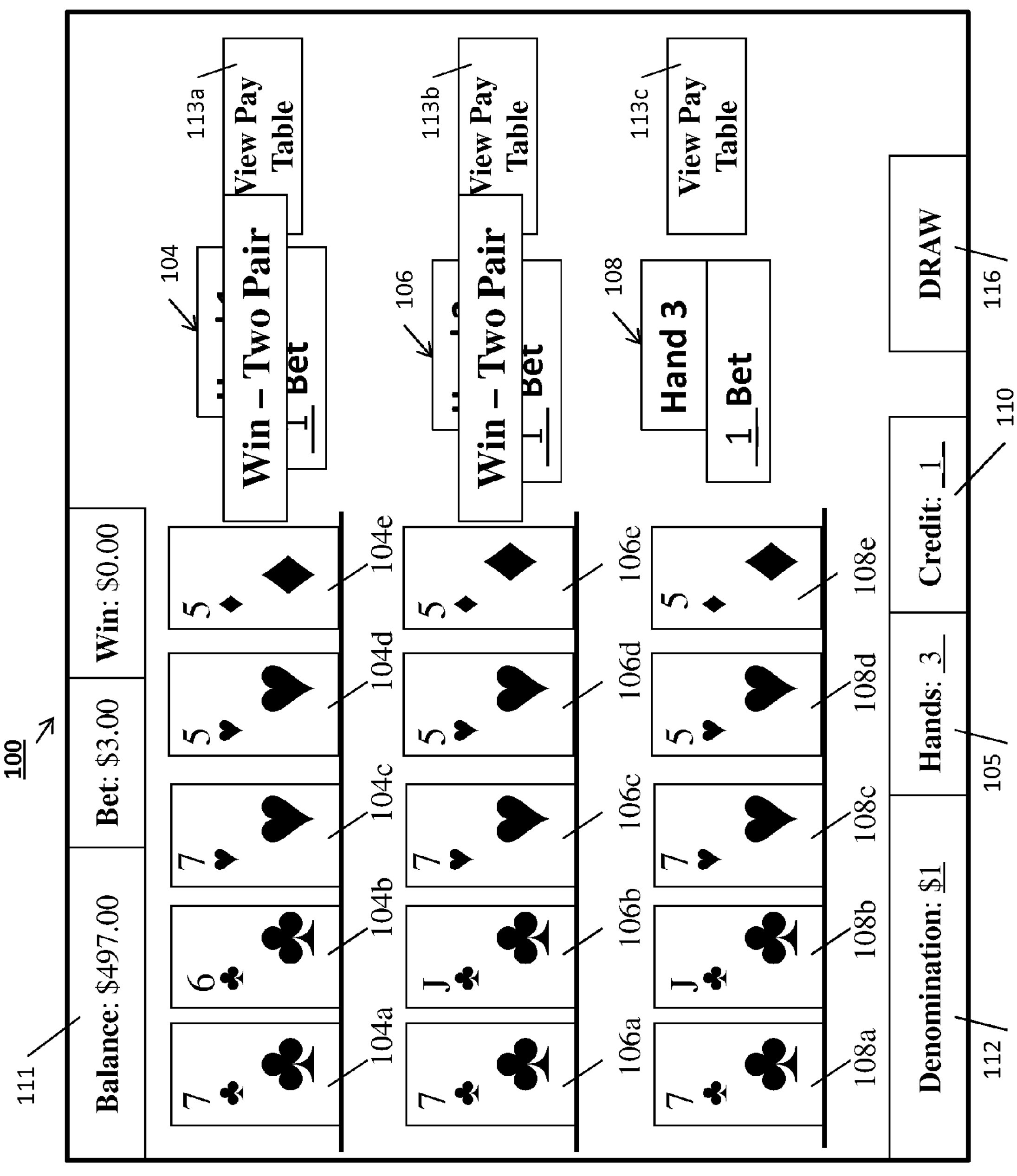

According to a further example operation of game 100, a player may again select "Deal" button/option 114. The selection of the button 114 may result in the cards of final hand 106 being copied/duplicated to hand 108, as shown in FIG. 1H, thereby indicating the start of hand 108. As another example, the selection of draw button 116 with respect to hand 106 may not only result in cards being drawn from the second deck to complete hand 106, but the cards of completed hand 106 being copied/duplicated to hand 108, thereby indicating the start of hand 106. Other variations are possible. (Again, according to the present example, the player chose to play three hands, as indicated by option 105. If the player had chosen to play two hands, for example, the game may end at the completion of hand 106.) Hence, in this example, hand 108 may start with a seven of clubs (108*a*), a jack of clubs (108*b*), a seven of hearts (108*c*), a five of hearts (108*d*), and a five of diamonds (108*e*).

As similarly described for hand 106, according to one example, the second deck of cards used for hand 106 may be discarded with the start of hand 108, with a new third deck of cards used for hand 108. Hence, this third deck may be viewed as having the seven of clubs (108*a*), the jack of clubs (108*b*), the seven of hearts (108*c*), the five of hearts (108*d*), and the five of diamonds (108*e*) dealt from it. In addition, the king of clubs, which was dealt from the first deck with respect to hand 104, and the six of clubs, which was dealt from the second deck with respect to hand 106, may be part of the third deck. As another example, the deck of cards used for hand 108 may be the same deck of cards as used for hand 104 and/or hand 106. As an example, assuming the same deck of cards is used for each of hands 104, 106, and 108, once completed hand 106 is copied/duplicated to hand 108, the status of the deck used for hand 108 may be a deck less:

The starting cards dealt to hand 108, i.e., the seven of clubs, the jack of clubs, the seven of hearts, the five of hearts, and the five of diamonds, The cards dealt to and discarded from hand 104, i.e., the king of clubs, and The cards dealt to and discarded from hand 106, i.e., the six of clubs.

Again, other variations are possible.

Figure 1I:
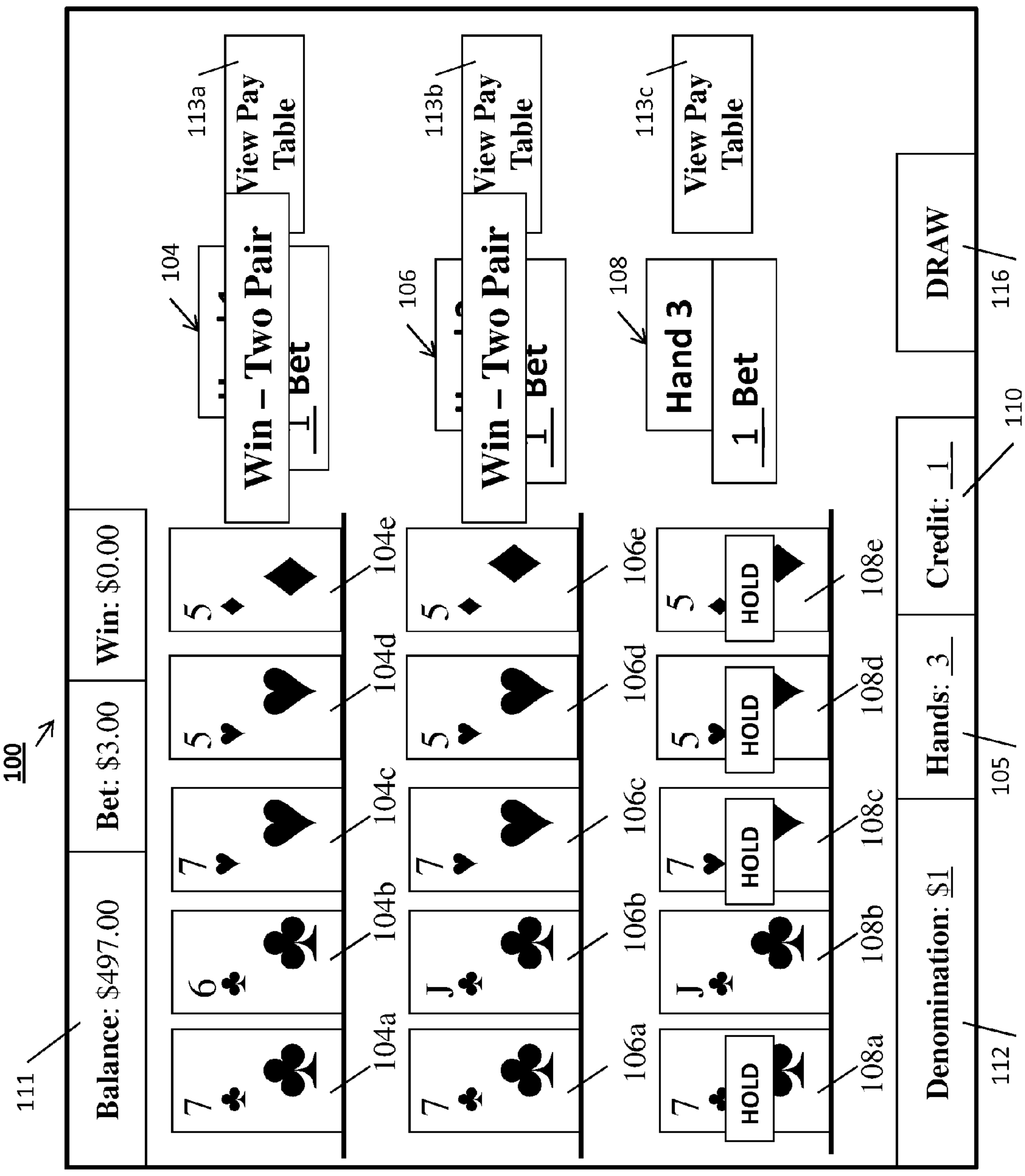

Similar to hands 104 and 106, a player may next select one or more of cards 108*a-e* of hand 108 to hold including selecting all of the cards to hold or none of the cards to hold (or viewed alternatively, one or more cards to discard). Hence, selecting cards to "hold" may be accomplished for example by a player selecting the cards the player wishes to hold or the player selecting the cards the player wishes to discard. If selecting cards to discard, such cards may disappear from hand 108 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (108*a*), the seven of hearts (108*c*), the five of hearts (108*d*), and the five of diamonds (108*e*), thereby discarding the jack of clubs (108*b*), as shown by FIG. 1I.

Figure 1J:
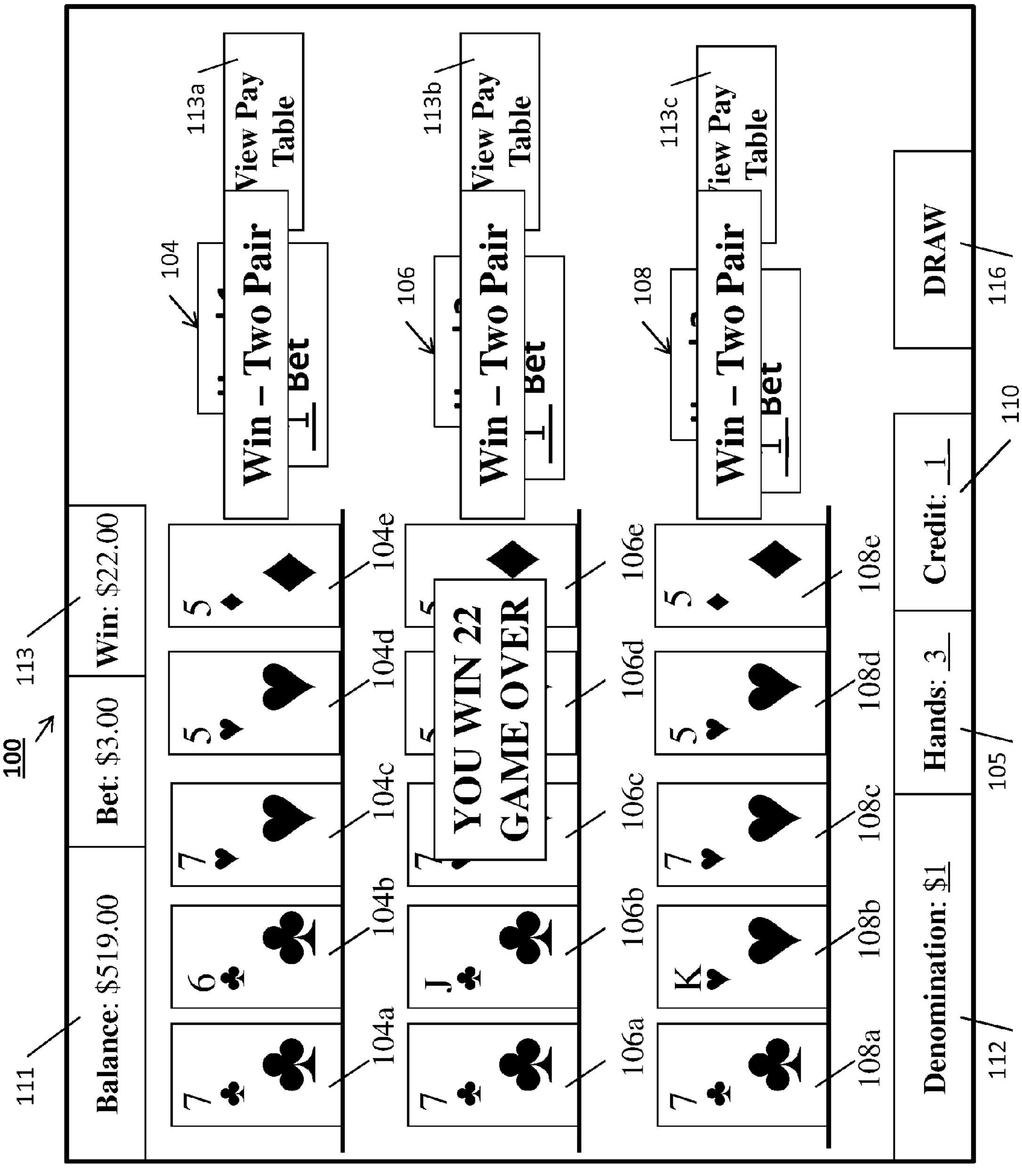

A player may next select "Draw" button/option 116. As shown in FIG. 1J, button 116 may result in non-held card(s) (here card 108*b*) disappearing from hand 108 (assuming the card(s) have not already disappeared), additional card(s) being drawn from the third deck to complete hand 108 to five cards (thereby forming a final hand), and the additional drawn card(s) being displayed to the player. In this example, a king of spades has been drawn from the third deck and displayed to the player in position 108*b*. Once additional cards have been drawn from the third deck to complete hand 108 to a final hand and because, in this example, the player chose to play three hands, a determination may now be made based on the final hand of cards as to whether hand 108 is a winning hand. Accordingly, an indication may be displayed to the player such as "win" or "lose". If hand 108 is a winning hand, and rules of poker are applied to the hand to make this determination, for example, the type of winning hand (here, two pair) may also be displayed to the player. In addition, the amount the player has won on hand 108 and/or the pay rate may also be indicated to the player. In addition, because the hand 108 is the last hand, a total amount the player has won across the played hands, assuming the player has won, may also be displayed (such as in "Win" field 113 and with "Balance" field 111 being increased accordingly), including an indication that the game is over. Again, other variations are possible.

According to one example of game 100, of the initial cards dealt to hand 104, a player may choose to hold them all, with these held cards being the complete hand on which a win/loss determination is made and with these cards then being the initial cards dealt to hand 106. Again, with respect to hand 106, a player may choose to hold them all, with these held cards being the complete hand on which a win/loss determination is made and with these cards then being the initial cards dealt to hand 108. Again, a player may choose to hold them all, with these held cards being the complete hand on which a win/loss determination is made. Other variations are possible.

The above is merely an example operation of game 100 including, for example, the cards dealt being an example, the number of hands being an example, the number of cards per hand being an example, etc.

Double Xtra Draw Poker

Figure 2A:
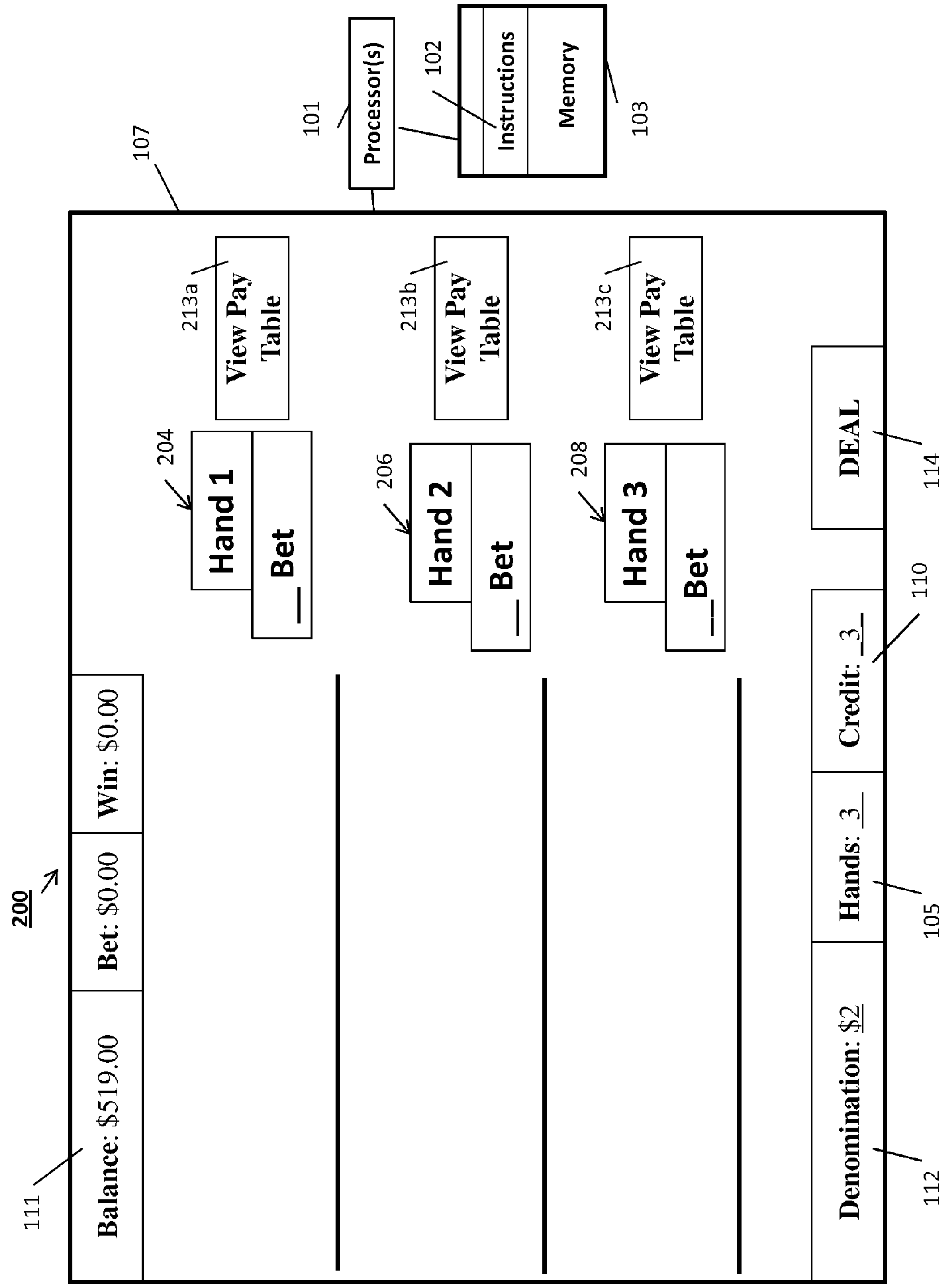
FIGS. 2A-2L show an example play of another example card game.

Referring now to FIG. 2A there is shown another example game 200. For example purposes, game 200 will be described as a single player game where the determination of whether a player wins or loses the game may be based on a set of rules applied to the player's hand(s). Similar to game 100, according to example game 200 a player may choose to play a plurality of hands of cards, such as one, two, or more hands, by entering for example a value in "Hands" field 105. In this example, three hands have been selected, which are represented by hands 204, 206, and 208. In this example, the player has three separate opportunities to win as represented by hands 204, 206, and 208 as further described herein. If the player had selected to play two hands, for example, the player would have two opportunities to win (e.g., Hand 3 may not be shown), and if the player had selected to play four hands, for example, the player would have four opportunities to win (e.g., a Hand 4 may be shown), etc. Other variations are possible including, for example, the determination of whether a player wins or loses being based on the player having to win all three hands, at least two hands, etc.

According to this example, a player may also place a wager on each of hands 204, 206, and 208. The amount wagered may be the same amount or a different amount for each hand. According to this example, the player has wagered the same amount on each hand. Here, the player makes a wager by by entering a value in "Credit" field 110 (here three credits), where each credit has a value as specified by the player entering a value in "Denomination" field 112 (here two dollars). As shown in this example, the player has an "account balance" of $519 as shown by "Balance" field 111 to which to play the game. Other variations of entering wagering amounts are possible, including wagering points, for example, rather than monetary amounts. The games disclosed herein may also be played for fun, where a player wagers nothing and wins nothing, wagers nothing and wins prizes, etc.

According to game 200, the determination of whether a given hand 204, 206, or 208 is a winning or losing hand is based on a "complete" hand of "n" cards, which in this example, is five cards (i.e., n=5). Nonetheless, a complete hand of cards may consist of any plurality on "n" cards including less than five cards or more than five cards. Similarly, each of hands 204, 206, or 208 for example may use a different number of cards to constitute a complete hand of cards. In this example, five cards make a complete hand for each of hands 204,206, and 208.

According to game 200, the rules used to determine whether any of hands 204, 206, and 208 is a winning hand may be poker based rules. Other rules may also be used including one or more of hands 204, 206, and 208 each using different rules. An example of poker based rules that may result in a winning hand may be similar rules as described herein for game 100. Other and/or additional rules may be used.

According to game 200, a pay table may be applied to each of hands 204, 206, and 208. The pay table may include payout rates that may be used to determine the amount a player wins when the player has a winning hand. For example, assuming a player wagers "x" credits on a given hand, a pay table may be used to determine the amount the player wins (payout) when the hand consists of (a) a royal flush, (b) a straight flush, (c) four of a kind, (d) a full house, (e) a flush, (f) a straight, (g) three of a kind, or (h) two pair. As an example, a pay table may consist of (a) a royal flush having the highest pay rate, (b) a straight flush having the next highest pay rate, (c) four of a kind having the next highest pay rate, (d) a full house having the next highest pay rate, (e) a flush having the next highest pay rate, (f) a straight having the next highest pay rate, (g) three of a kind having the next highest pay rate, and (h) two pair having the lowest pay rate. Other pay tables may be used. According to one example, a player may be paid only once according to the highest pay rate that applies to a given hand. The pay table applied to each of hands 204, 206, 208, etc. may be the same (i.e., have the same pay rates) or may differ (i.e., have one or more different pay rates) for one or more hands. According to one example, the pay table for hand 204 may have the highest pay rates, the pay table for hand 206 may have the next highest pay rates, and the pay table for hand 208 may have the lowest pay rates, etc. Hence, assuming a player wagers one credit on each of hands 204, 206, and 208 and achieves for each of these hands a royal flush, the player may be paid the most for hand 204, the next most for hand 206, and the least for hand 208. Other pay tables/pay rates may be used. For example, the pay table for hand 208 may have the highest pay rates, the pay table for hand 206 may have the next highest pay rates, and the pay table for hand 204 may have the lowest pay rates, etc. As shown in FIG. 2A, one or more "View Pay Table" options 213*a-c* may be available for selection by a player to view respective pay table(s) for each of hands 204, 206, and 208. As another example, a single "View Pay Table" option may be provided that provides payouts for each of the hands. Other variations are possible.

Figure 2B:
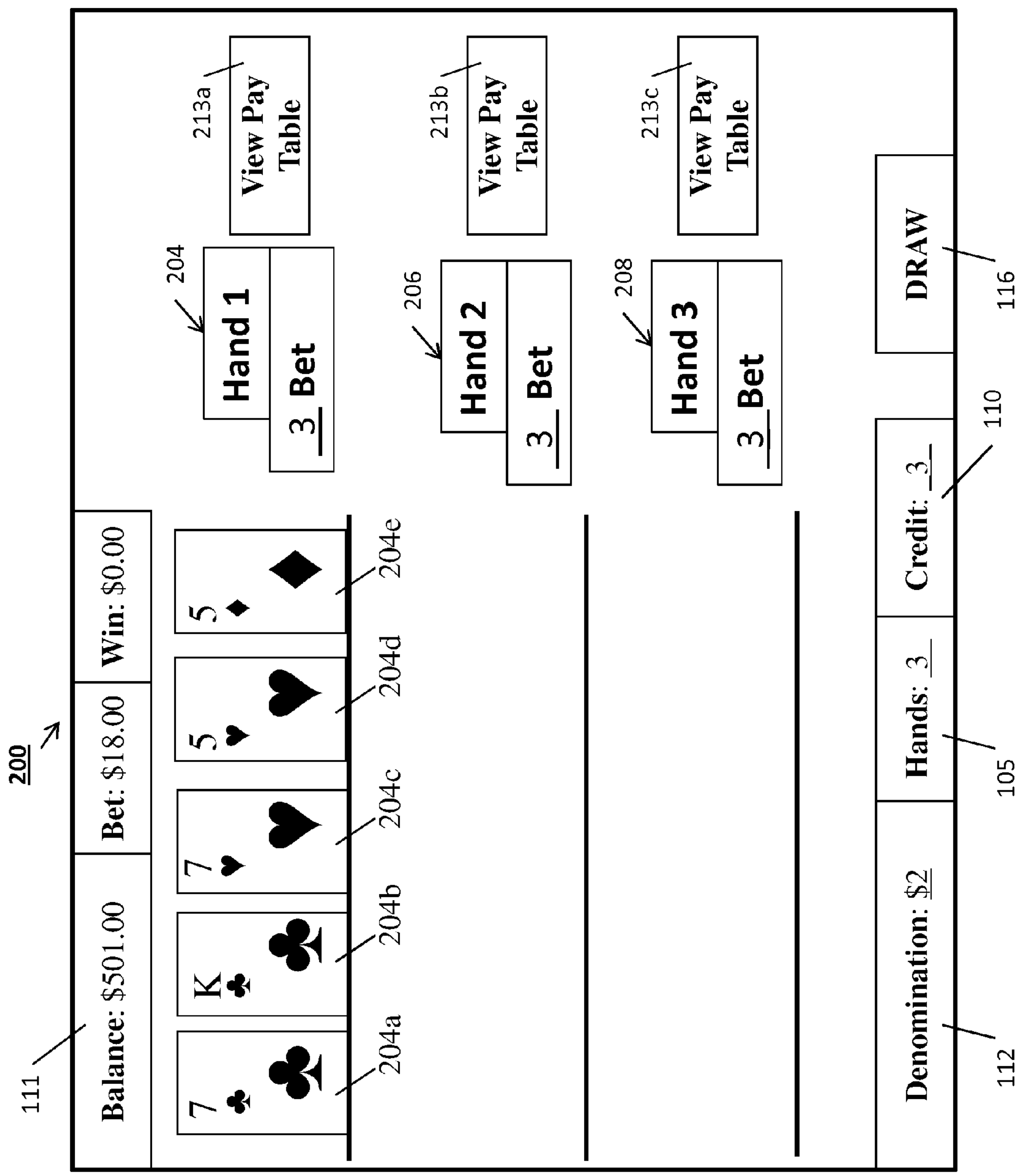
Figure 2C:
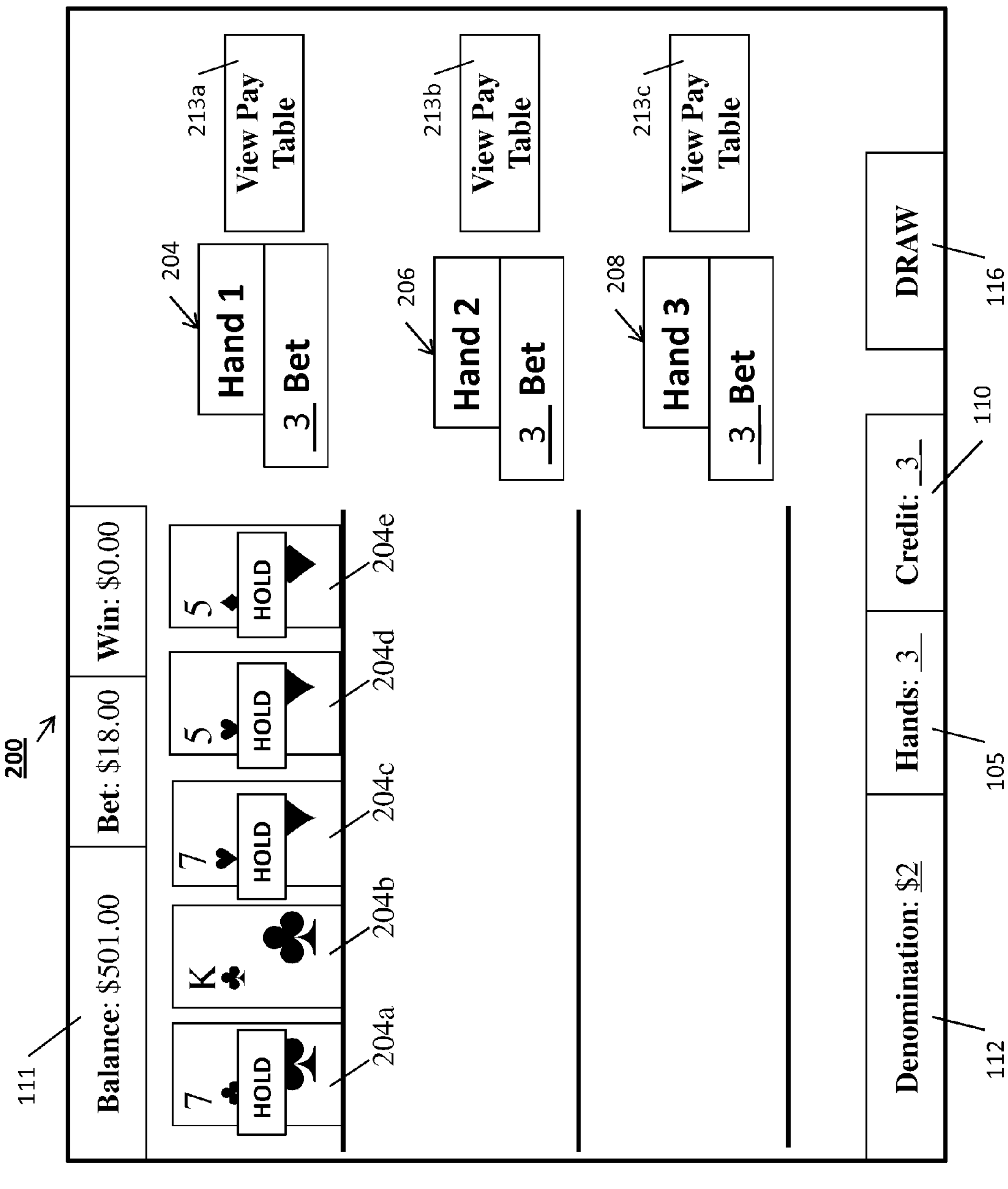

Referring further to an example operation of game 200, a player (after selecting the number of hands and possibly wager amount(s), for example) may select "Deal" button/option 114 (the word "deal" as used herein is merely example and other words, such as "draw" may be used to indicate the action of a player selecting card(s) from a deck/having cards drawn from a deck). Deal button 114 may result in a plurality of cards being drawn from a first deck of cards and displayed face up to the player in hand 204 (see FIG. 2B). In this example, hand 204 consists of five cards (represented by positions 204*a-e*), which makes a complete hand. Again, five cards are merely an example. In this example, hand 204 consists of a seven of clubs (204*a*), a king of clubs (204*b*), a seven of hearts (204*c*), a five of hearts (204*d*), and a five of diamonds (204*e*). A player may next select one or more of cards 204*a-e* to hold including selecting all of the cards to hold or none of the cards to hold (or viewed alternatively, one or more cards to discard). Hence, selecting cards to "hold" may be accomplished for example by a player selecting the cards the player wishes to hold or the player selecting the cards the player wishes to discard. If selecting cards to discard, such cards may disappear from hand 206 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (204*a*), the seven of hearts (204*c*), the five of hearts (204*d*), and the five of diamonds (204*e*) as shown by FIG. 2C.

Figure 2D:
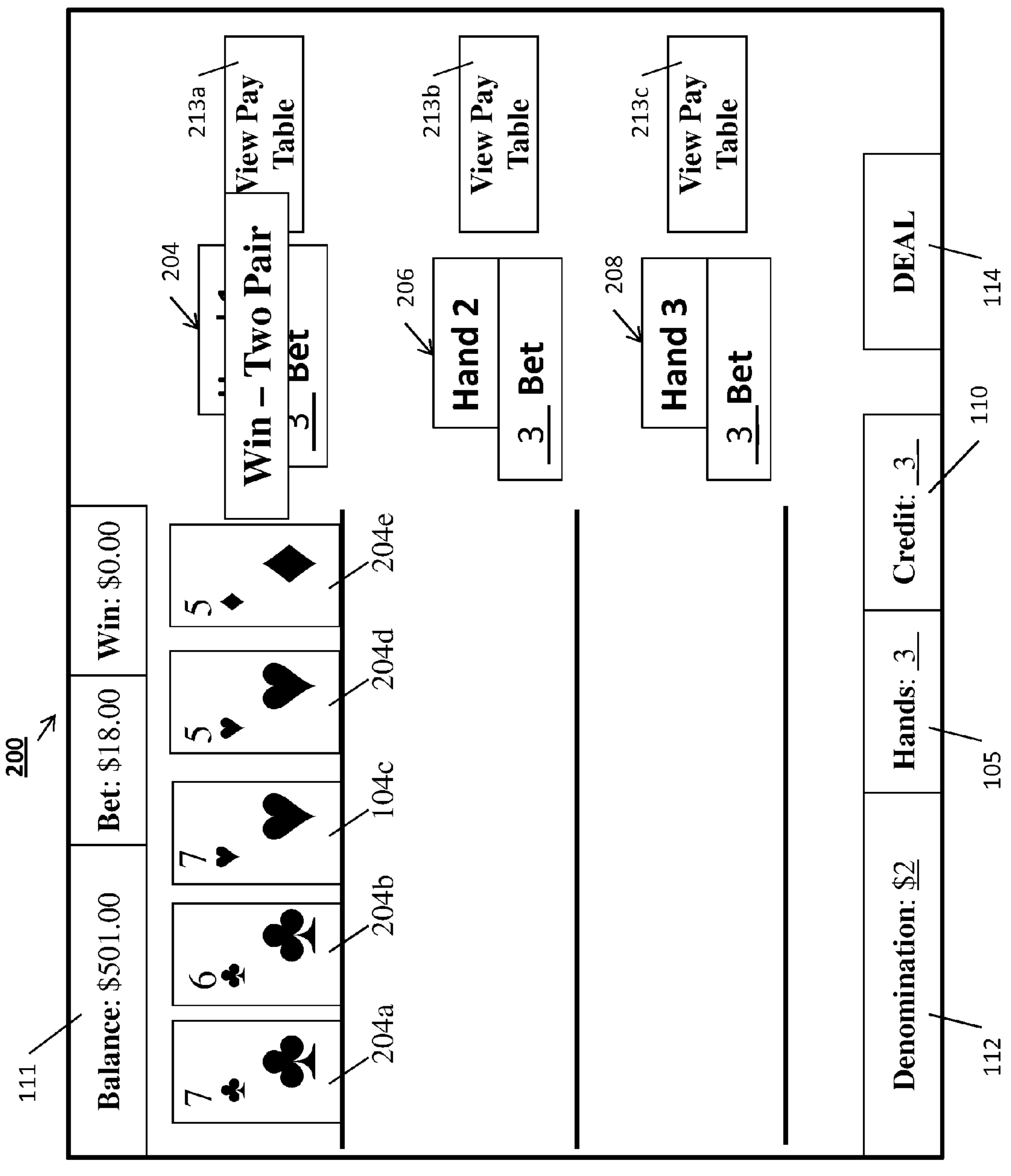

A player may next select "Draw" button/option 116 (the word "draw" is merely an example and other words such as "deal" may be used to indicate the action of a player selecting card(s) from a deck/having cards drawn from a deck). As shown in FIG. 2D, draw button 116 may result in non-held card(s) (here card 204*b*) disappearing from hand 204 (assuming the card(s) have not already disappeared), additional card(s) being drawn from the first deck to complete hand 204 to five cards (thereby forming a final hand), and the additional drawn card(s) being displayed to the player. In this example, a six of clubs has been drawn from the first deck and displayed to the player in position 204*b*. Once additional cards have been drawn from the first deck to complete hand 204 to a final hand, a determination may be made based on the final hand of cards as to whether hand 204 is a winning hand. This determination may also be made at another time, such as after the completion of each of hands 204, 206, and 208. Assuming the determination is made now, an indication may be displayed to the player such as "win" or "lose". If hand 204 is a winning hand, and rules of poker are applied to the hand to make this determination, for example, the type of winning hand (here, two pair) may also be displayed to the player. In addition, the amount the player has won and/or the pay rate may also be indicated to the player.

Figure 2E:
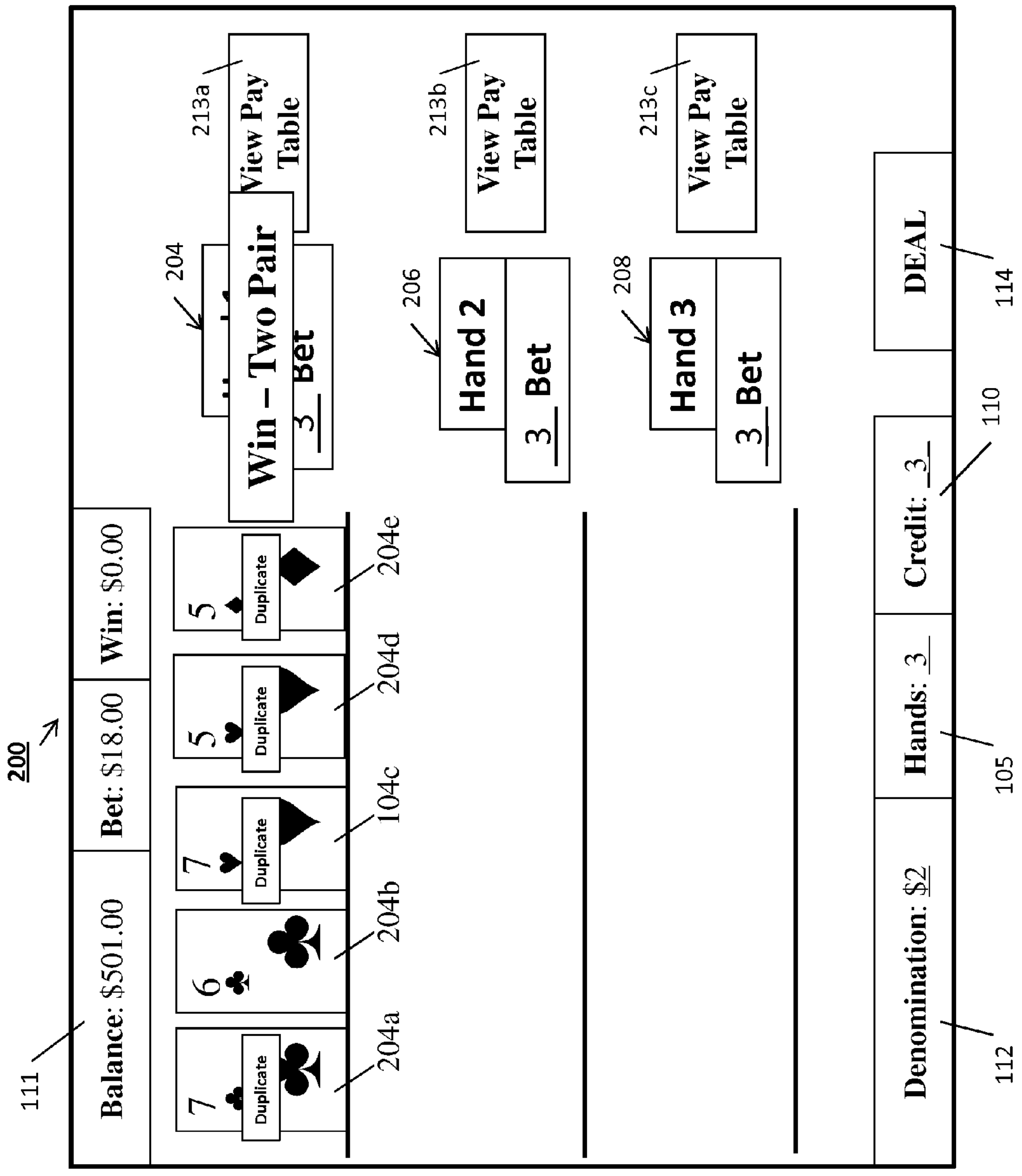

According to a further example operation of game 200, a player may next select one or more of cards 204*a-e* of hand 204 to duplicate/copy to hand 206 including selecting all of the cards to duplicate/copy to hand 206 or none of the cards to duplicate/copy to hand 206. In selecting one or more cards to duplicate/copy, a player may be viewed as effectively selecting one or more cards to not duplicate/not copy to hand 206. Hence, selecting cards to "duplicate"/"copy" may be accomplished for example by a player selecting the cards the player wishes to duplicate/copy or the player selecting the cards the player wishes to discard/not duplicate/not copy If selecting cards to discard/not duplicate/not copy, such cards may disappear from hand 204 upon selection, a discard indication (such as the word "discard," "not duplicate," "not copy," etc.) may be displayed in connection with the discarded card(s), etc. If selecting cards to duplicate/copy, a duplicate indication (such as the word "duplicate," "copy," etc.) may be displayed in connection with the selected card(s). As an example, a player may select to duplicate/copy the seven of clubs (204*a*), the seven of hearts (204*c*), the five of hearts (204*d*), and the five of diamonds (204*e*) as shown by FIG. 2E.

Figure 2F:
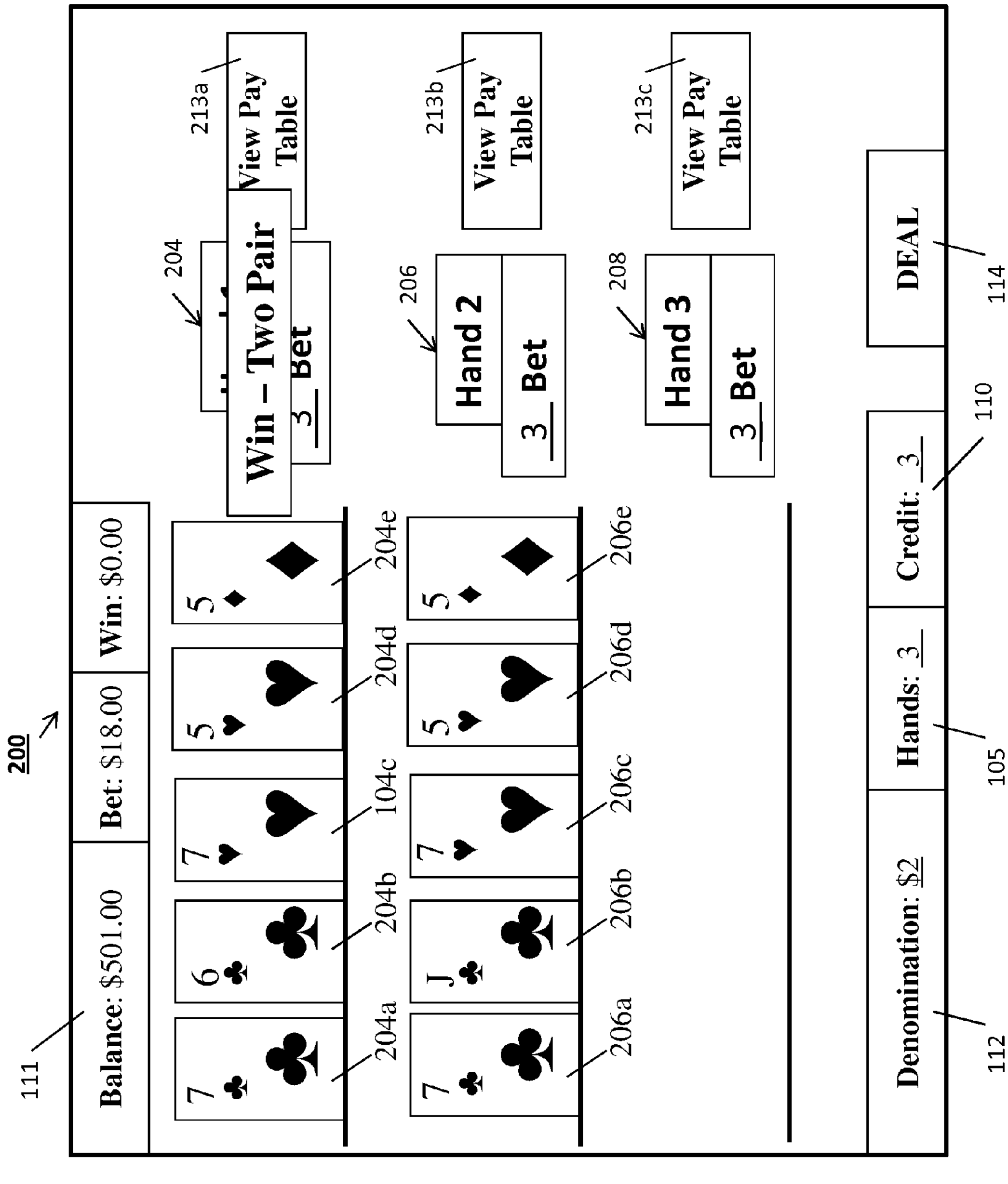

Once selecting cards to duplicate/copy from hand 204 to hand 206, a player may select "Deal" button/option 114. The selection of button 114 may result in the cards of final hand 204 that have been selected for duplication/copying being copied/duplicated to hand 206, as shown in FIG. 2F (the seven of clubs (206*a*), the seven of hearts (206*c*), the five of hearts (206*d*), and the five of diamonds (206*e*) being copied). In addition and as also shown in FIG. 2F, in the event all cards from hand 204 are not duplicated/copied to hand 206, selection of "Deal" button/option 114 may also result in additional cards being dealt to hand 206 to form a complete hand (here, the jack of clubs (204*b*) being dealt), and thereby indicating the start of hand 206. Other variations may be used to start hand 206. For example, in selecting card(s) to duplicate/copy from hand 204 to hand 206, as selected the card(s) may be duplicated to hand 206. Thereafter, "Deal" button/option 114 may be selected resulting in additional card(s), if any, being dealt to hand 206 to form a complete hand, and thereby indicating the start of hand 206. Again, other variations are possible.

Hence, in this example, hand 206 may start with a seven of clubs (206*a*), a jack of clubs (206*b*), a seven of hearts (206*c*), a five of hearts (206*d*), and a five of diamonds (206*e*). According to one example, the first deck of cards used for hand 204 may be discarded with the start of hand 206, with a new second deck of cards being used for hand 206. Hence, this second deck may be viewed as having the seven of clubs (206*a*), the jack of clubs (206*b*), the seven of hearts (206*c*), the five of hearts (206*d*), and the five of diamonds (206*e*) dealt from it. In addition, the king of clubs and the six of clubs, which were dealt from the first deck with respect to hand 204, may be part of the second deck. As another example, the deck of cards used for hand 206 may be the same deck of cards as used for hand 204. Hence, once card(s) (if any) from hand 204 are copied/duplicated to hand 206, the status of the deck used for hand 204 may be the starting point for hand 206. Here, for example, the king of clubs and the six of clubs, which were dealt from the first deck with respect to hand 204, may not be part of the deck. Other variations are possible.

Figure 2G:
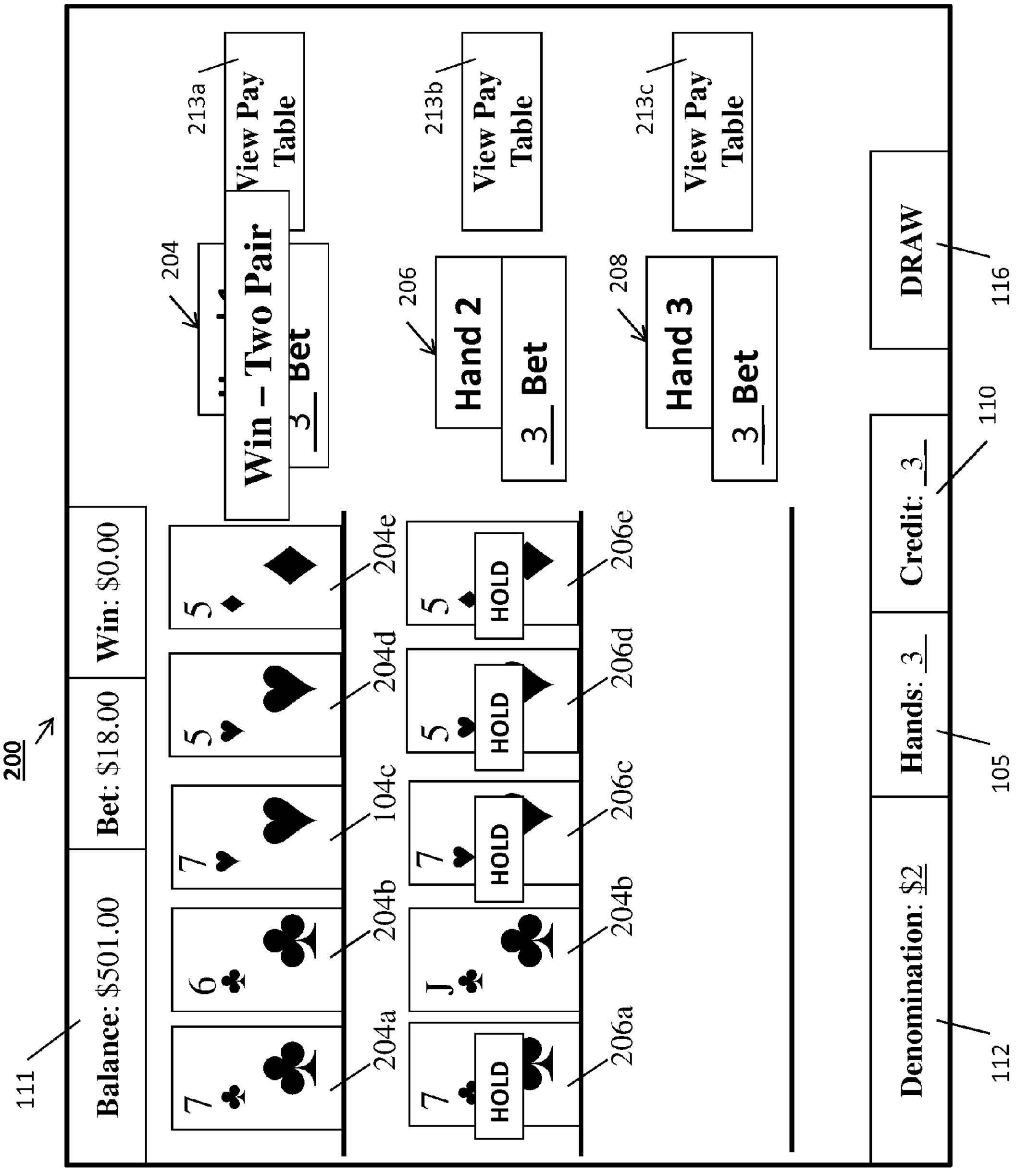

Similar to hand 204, a player may next select one or more of cards 206*a-e* of hand 206 to hold including selecting all of the cards to hold or none of the cards to hold (or viewed alternatively, one or more cards to discard). Hence, selecting cards to "hold" may be accomplished for example by a player selecting the cards the player wishes to hold or the player selecting the cards the player wishes to discard. If selecting cards to discard, such cards may disappear from hand 206 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (206*a*), the seven of hearts (206*c*), the five of hearts (206*d*), and the five of diamonds (206*e*), thereby discarding the jack of clubs (206*b*) as shown by FIG. 2G.

Figure 2H:
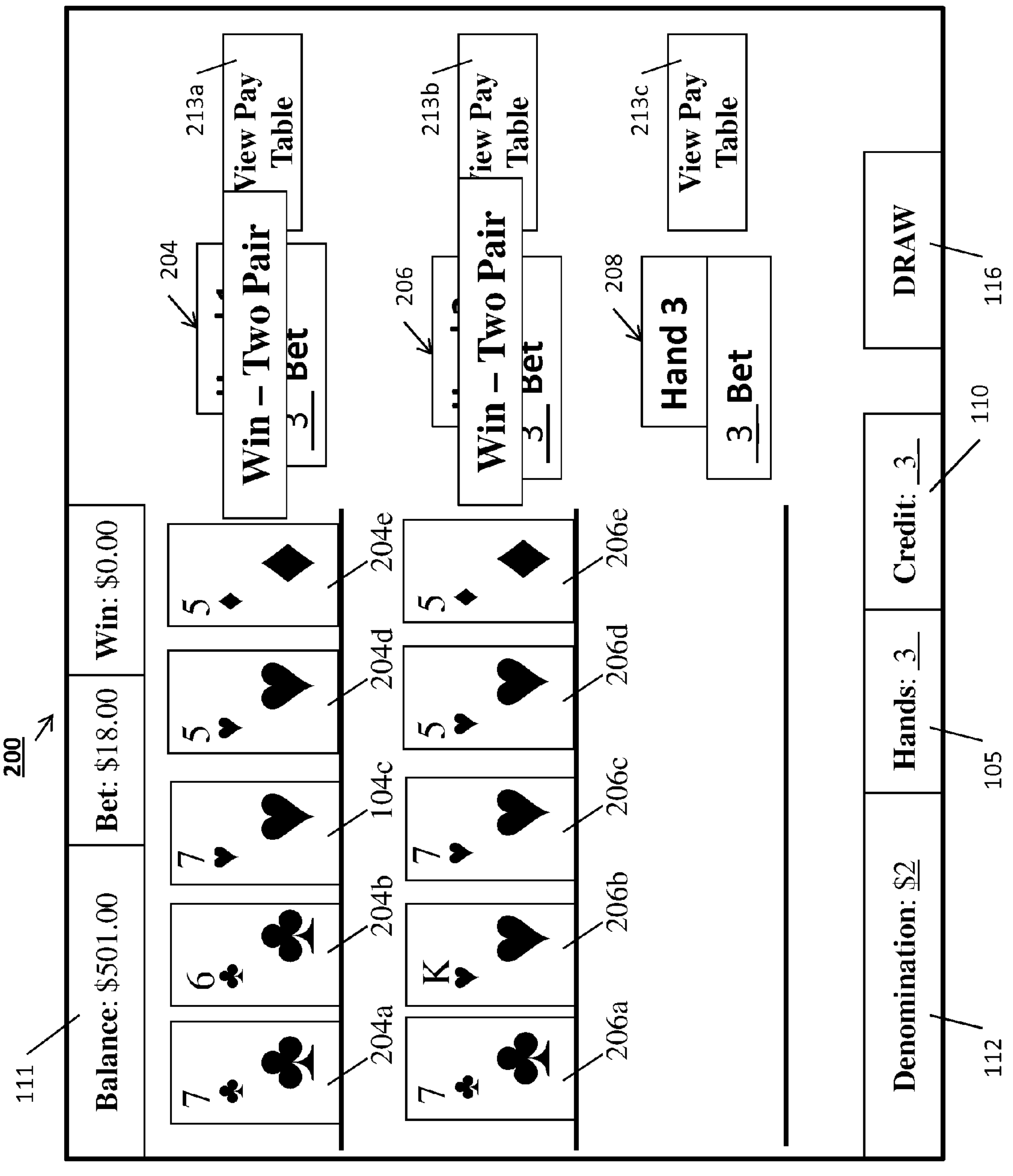

A player may next select "Draw" button 116. As shown in FIG. 2H, draw button 116 may result in non-held card(s) (here card 206*b*) disappearing from hand 206 (assuming the card(s) have not already disappeared), additional card(s) being drawn from the second deck to complete hand 206 to five cards (thereby forming a final hand), and the additional drawn card(s) being displayed to the player. In this example, a king of hearts has been drawn from the second deck and displayed to the player in position 206*b*. Once additional cards have been drawn from the second deck to complete hand 206 to a final hand, a determination may be made based on the final hand of cards as to whether hand 206 is a winning hand. This determination may also be made at another time, such as after the completion of each of hands 206 and 208. Assuming the determination is made now, an indication may be displayed to the player such as "win" or "lose". If hand 206 is a winning hand, and rules of poker are applied to the hand to make this determination, for example, the type of winning hand (here, two pair) may also be displayed to the player. In addition, the amount the player has won and/or the pay rate may also be indicated to the player.

Figure 2I:
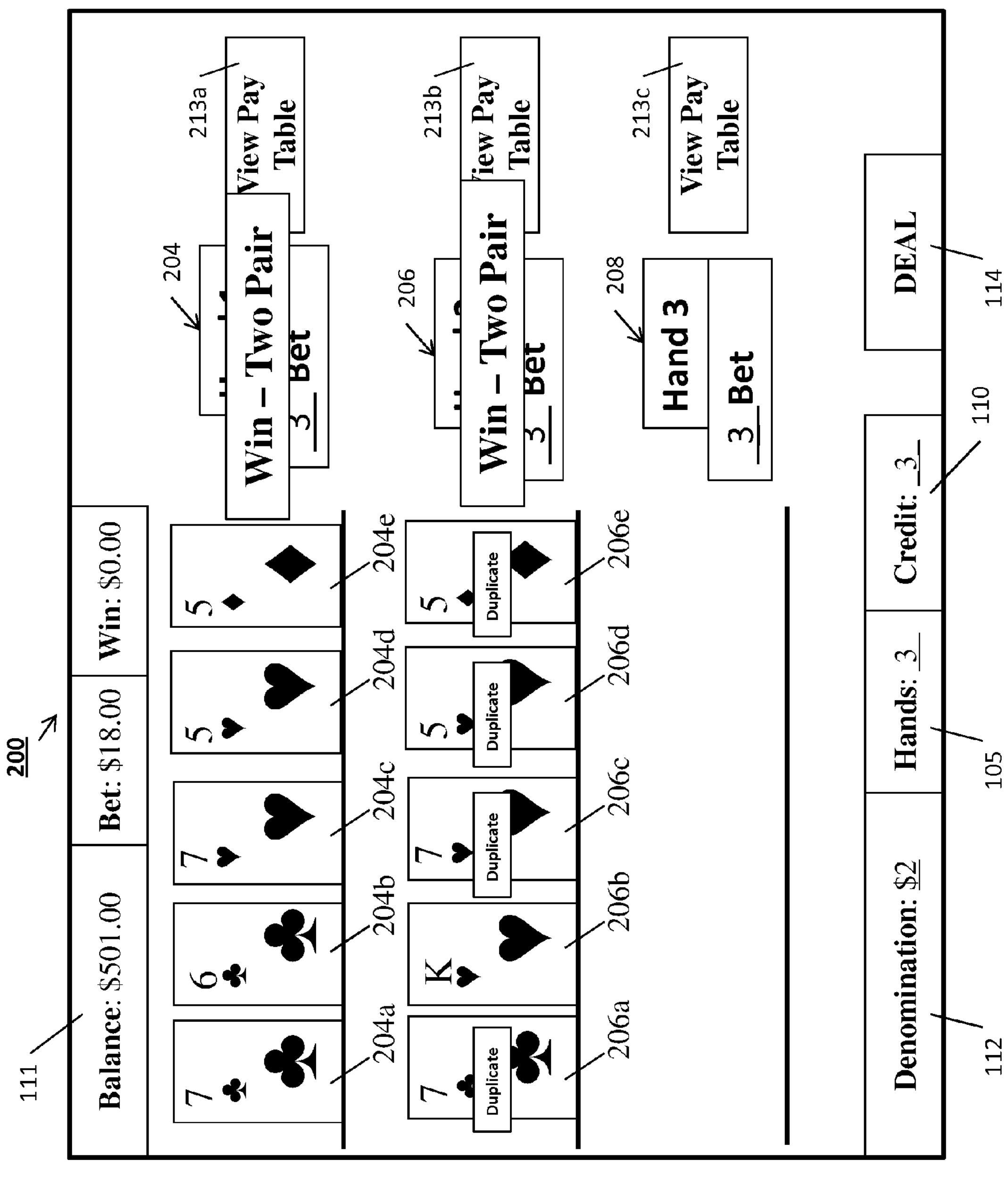

According to a further example operation of game 200, a player may next select one or more of cards 206*a-e* of hand 206 to duplicate/copy to hand 208 including selecting all of the cards to duplicate/copy to hand 208 or none of the cards to duplicate/copy to hand 208 (or viewed alternatively, one or more cards to not duplicate/not copy). Hence, selecting cards to "duplicate"/"copy" may be accomplished for example by a player selecting the cards the player wishes to duplicate/copy or the player selecting the cards the player wishes to discard/not duplicate/not copy If selecting cards to discard/not duplicate/not copy, such cards may disappear from hand 206 upon selection, a discard indication (such as the word "discard," "not duplicate," "not copy," etc.) may be displayed in connection with the discarded card(s), etc. If selecting cards to duplicate/copy, a duplicate indication (such as the word "duplicate," "copy," etc.) may be displayed in connection with the selected card(s). As an example, a player may select to duplicate/copy the seven of clubs (204*a*), the seven of hearts (204*c*), the five of hearts (204*d*), and the five of diamonds (204*e*) as shown by FIG. 2I.

Figure 2J:
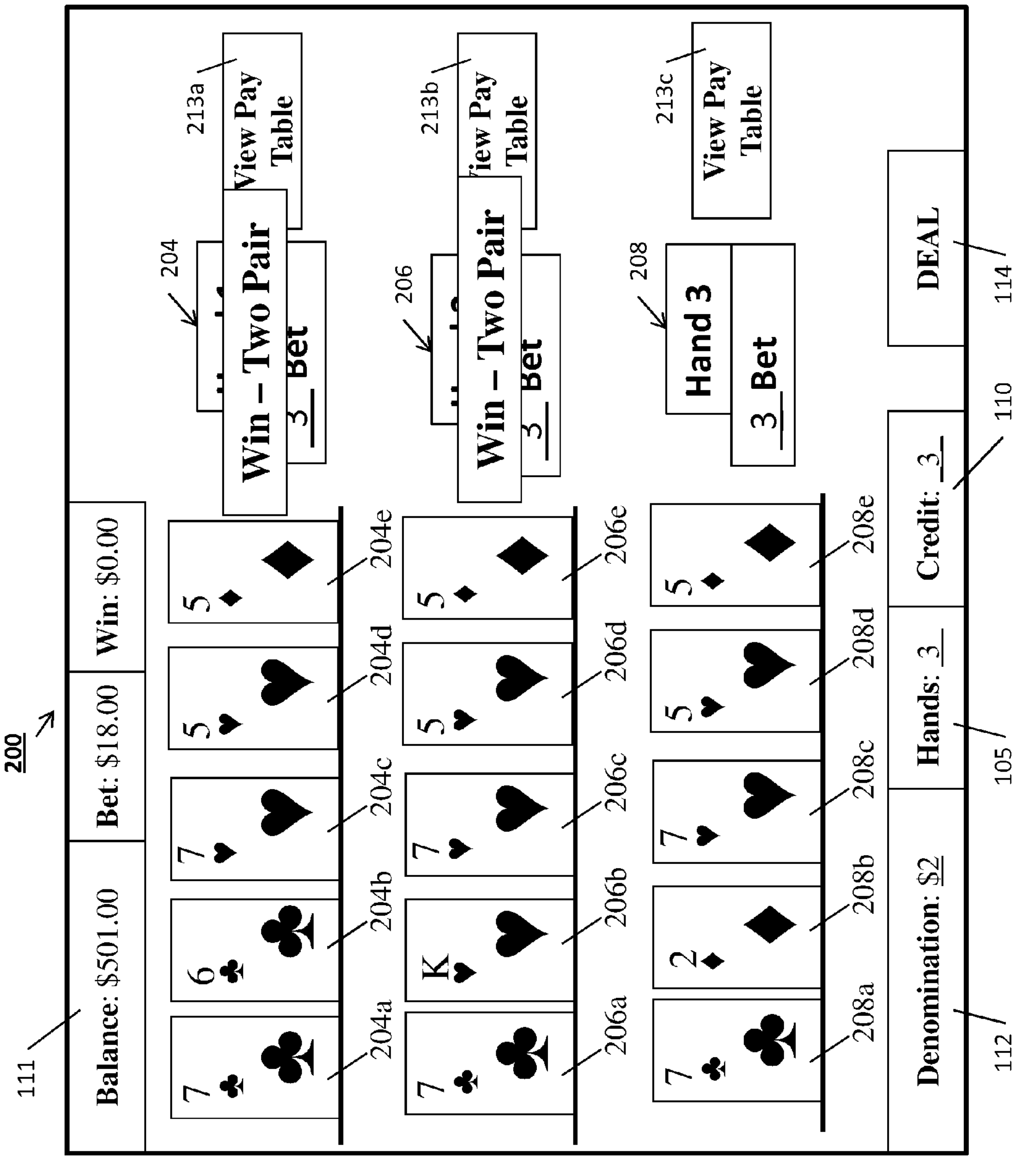

Once selecting cards to duplicate/copy from hand 206 to hand 208, as similarly discussed above a player may select "Deal" button/option 114. The selection of button 114 may result in the cards of final hand 206 that have been selected for duplication/copying being copied/duplicated to hand 208, as shown in FIG. 2J (the seven of clubs (208*a*), the seven of hearts (208*c*), the five of hearts (208*d*), and the five of diamonds (208*e*) being copied). In addition and as also shown in FIG. 2J, in the event all cards from hand 206 are not duplicated/copied to hand 208, selection of Deal" button/option 114 may also result in additional cards being dealt to hand 208 to form a complete hand (here, the two of diamonds (208*b*) being dealt), and thereby indicating the start of hand 208. Again, other variations may be used to start hand 208. For example, in selecting card(s) to duplicate/copy from hand 206 to hand 208, as selected the card(s) may be duplicated to hand 208. Thereafter, "Deal" button/option 114 may be selected resulting in additional card(s) if any, being dealt to hand 208 to form a complete hand, and thereby indicating the start of hand 208. Again, other variations are possible.

Hence, in this example, hand 208 may start with a seven of clubs (208*a*), a two of diamonds (208*b*), a seven of hearts (208*c*), a five of hearts (208*d*), and a five of diamonds (208*e*). According to one example, the second deck of cards used for hand 206 may be discarded with the start of hand 208, with a new third deck of cards being used for hand 208. Hence, this third deck may be viewed as having the seven of clubs (208*a*), the two of diamonds (208*b*), the seven of hearts (208*c*), the five of hearts (208*d*), and the five of diamonds (208*e*) dealt from it. In addition, the king of clubs and the six of clubs, which were dealt from the first deck with respect to hand 204, and the jack of clubs and king of hearts, which were dealt from the second deck with respect to hand 206, may be part of the third deck. As another example, the deck of cards used for hand 208 may be the same deck of cards as used for hand 204 and/or hand 206. As an example, assuming the same deck of cards is used for each of hands 204, 206, and 208, once card(s) (if any) from hand 204 are copied/duplicated to hand 208, the status of the deck used for hand 208 may be a deck less:

The starting cards dealt to hand 208, i.e., the seven of clubs, two of diamonds, the seven of hearts, the five of hearts, and the five of diamonds, The cards dealt to and discarded from hand 204, i.e., the king of clubs and the six of clubs, and The cards dealt to and discarded from hand 206, i.e., jack of clubs and king of hearts.

Again, other variations are possible.

Figure 2K:
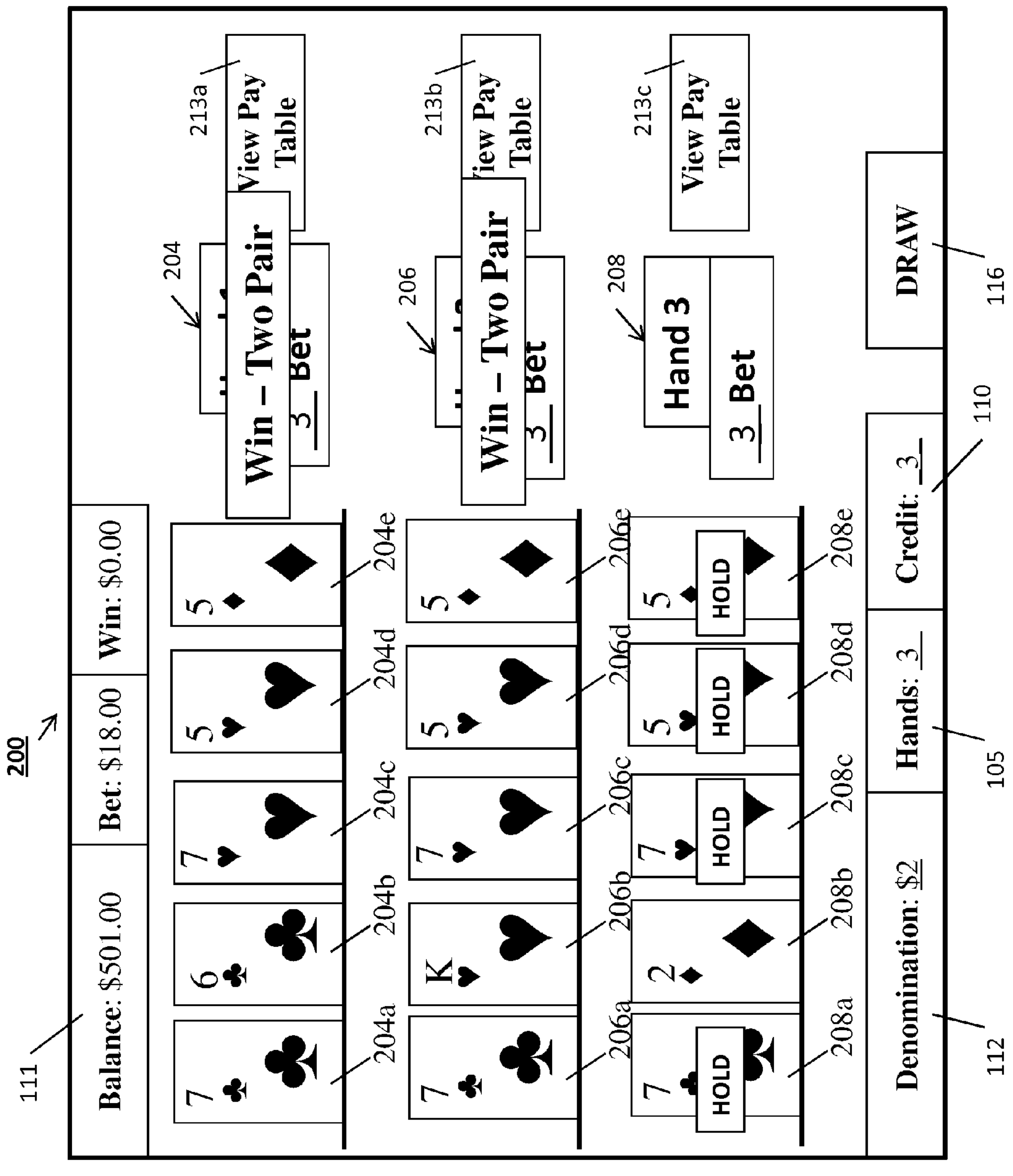

Similar to hands 204 and 206, a player may next select one or more of cards 208*a-e* of hand 208 to hold including selecting all of the cards to hold or none of the cards to hold (or viewed alternatively, one or more cards to discard). Hence, selecting cards to "hold" may be accomplished for example by a player selecting the cards the player wishes to hold or the player selecting the cards the player wishes to discard. If selecting cards to discard, such cards may disappear from hand 208 upon selection, a discard indication (such as the word "discard") may be displayed in connection with the discarded card(s), etc. If selecting cards to hold, a hold indication (such as the word "hold") may be displayed in connection with the held card(s). As an example, a player may select to hold the seven of clubs (208*a*), the seven of hearts (208*c*), the five of hearts (208*d*), and the five of diamonds (208*e*), thereby discarding the jack of clubs (208*b*) as shown by FIG. 2K.

Figure 2L:
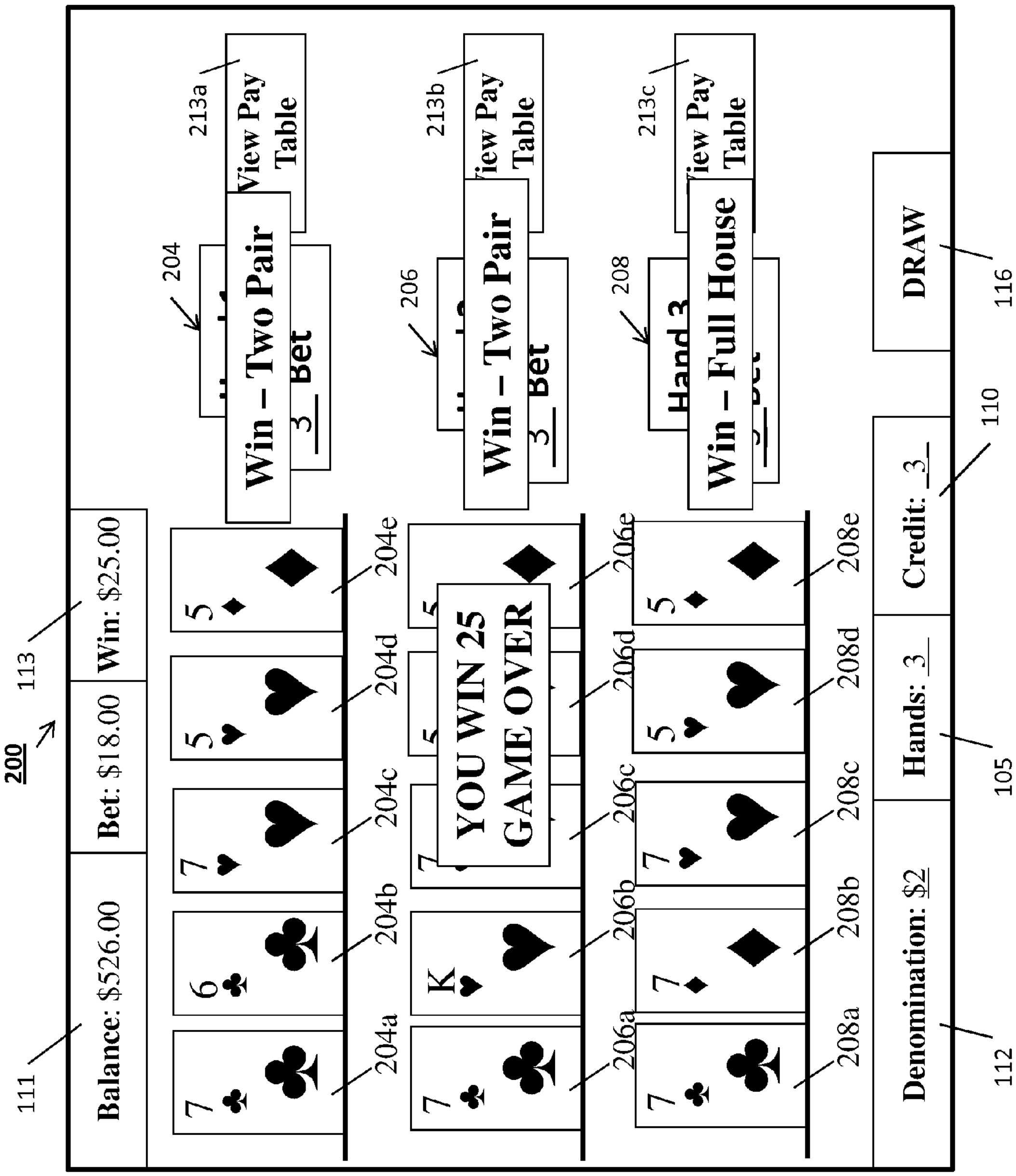

A player may next select "Draw" button 116. As shown in FIG. 2L, draw button 116 may result in non-held card(s) (here card 208*b*) disappearing from hand 206 (assuming the card(s) have not already disappeared), additional card(s) being drawn from the third deck to complete hand 208 to five cards (thereby forming a final hand), and the additional drawn card(s) being displayed to the player. In this example, a seven of diamonds has been drawn from the third deck and displayed to the player in position 208*b*. Once additional cards have been drawn from the third deck to complete hand 208 to a final hand, a determination may be made based on the final hand of cards as to whether hand 208 is a winning hand. Accordingly, an indication may be displayed to the player such as "win" or "lose". If hand 208 is a winning hand, and rules of poker are applied to the hand to make this determination, for example, the type of winning hand (here, full house) may also be displayed to the player. In addition, the amount the player has won on hand 208 and/or the pay rate may also be indicated to the player. In addition, because the hand 208 is the last hand, a total amount the player has won across the played hands, assuming the player has won, may also be displayed (such as in "Win" field 113 and with Balance Field 111 being increased accordingly), including an indication that the game is over. Again, other variations are possible.

The above is merely an example operation of game 200 including, for example, the cards dealt being an example, the number of hands being an example, the number of cards per hand being an example, etc.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

What is claimed is:

1. A method comprising:

dealing, by at least one processor of at least one computer, "n" cards of a first hand, in which the act of dealing comprises causing indicia of the "n" cards of the first hand to be displayed at an interface of an electronic display device in electronic communication with the at least one computer;

receiving by the at least one processor a first selection from a player via an input device of the at least one computer, the first selection indicating that one of:

a) one or more of the n cards of the first hand are to be held in the first hand; and b) none of the n cards of the first hand are to be held in the first hand, wherein any card not selected to be held is discarded from the first hand;

responsive to one or more cards being discarded from the first hand, drawing by at least one processor one or more cards to complete the first hand to have n cards to form a final first hand, in which the act of drawing one or more cards to complete the first hand comprises causing indicia of the drawn one or more cards to be displayed in the final first hand at the interface of the electronic display device;

providing by the at least one processor an opportunity to select one or more cards of the final first hand to be duplicated to a second hand;

receiving by the at least one processor via the input device a second selection from the player, the second selection indicating that none of the n cards of the final first hand are to be duplicated to the second hand;

responsive to the second selection, drawing by at least one processor n cards to complete the second hand to have n cards;

receiving by the at least one processor via the input device a third selection from the player, the third selection indicating that one of:

a) one or more of the n cards of the second hand are to be held in the second hand; and b) none of the n cards of the second hand are to be held in the second hand, wherein any card not selected to be held is discarded from the second hand;

responsive to one or more cards being discarded from the second hand, drawing by at least one processor one or more cards to complete the second hand to have n cards to form a final second hand, in which the act of drawing one or more cards to complete the second hand comprises causing indicia of the drawn one or more cards to be displayed in the final second hand at the interface of the electronic display device;

determining by the at least one processor whether the final first hand is a winning hand or a losing hand, in which the act of determining whether the final first hand is a winning hand or a losing hand comprises determining that the final first hand is a winning hand;

determining by the at least one processor whether the final second hand is a winning hand or a losing hand, in which the act of determining whether the final second hand is a winning hand or a losing hand comprises determining that the final second hand is a winning hand, in which at least one wager amount wagered by the player in connection with the final first hand and the final second hand is stored in an electronic account prior to the act of determining whether the final second hand is a winning hand or losing hand, and in which the acts of determining whether the final first hand is a winning hand or a losing hand and determining whether the final second hand is a winning hand or a losing hand comprises determining that at least one of the first hand and the second hand is a losing hand; and responsive to determining that determining that at least one of the first hand and the second hand is a losing hand, causing the at least one wager amount wagered by the player to be surrendered, in which the at least one computer is configured to cause a payout payment to be paid to an electronic account of the first player responsive to determinations that each and every final hand including the final first hand and the final second hand is a winning hand.

2. The method of claim 1, wherein the at least one computer is configured to pay an identical payout for the final first hand as for the final second hand when the final first hand and the final second hand comprise the same cards.

3. The method of claim 1, wherein the at least one computer is configured to pay a different payout for the final first hand and for the final second hand when the final first hand and the final second hand comprise the same cards.

4. The method of claim 3, wherein the at least one computer is configured to pay a higher payout for the first hand than for the second hand when the final first hand and the final second hand comprise the same cards.

5. The method of claim 3, wherein the at least one computer is configured to pay a lower payout for the first hand than for the second hand when the final first hand and the final second hand comprise the same cards.

6. The method of claim 1, further comprising:

receiving by at least one processor a fourth selection, the fourth selection indicating that one of:

a) one or more of the n cards of the final second hand are to be duplicated to a third hand; and b) none of the n cards of the final second hand are to be duplicated to the third hand;

responsive to one or more cards being selected from the final second hand to be duplicated to the third hand, duplicating by at least one processor the selected cards from the final second hand to the third hand;

responsive to fewer than n cards being duplicated from the final second hand to the third hand, drawing by at least one processor one or more cards to complete the third hand to have n cards;

receiving by at least one processor a fifth selection, the fifth selection indicating that one of:

a) one or more of the n cards of the third hand are to be held; and b) none of the n cards of the third hand are to be held, wherein any card not selected to be held is discarded from the third hand;

responsive to one or more cards being discarded from the third hand, drawing by at least one processor one or more cards to complete the third hand to have n cards to form a final third hand; and determining by at least one processor whether the final third hand is a winning hand or a losing hand, in which the at least one computer is configured to cause a payout payment to be paid to an electronic account of the first player responsive to determinations that the final first hand, the final second hand, and the final third hand are each winning hands.

7. The method of claim 1, in which the payout amount comprises a first payout component associated with the first hand and a second payout component associated with the second hand, wherein a pay table is used to determine the first payout associated with the first hand, and wherein a pay table is used to determine the second payout associated with the second hand.

8. The method of claim 7, wherein the pay table used to determine the first payout associated with the first hand and the payout table used to determine the second payout associated with the second hand have the same pay rates.

9. The method of claim 7, wherein the pay table used to determine the first payout associated with the first hand and the payout table used to determine the second payout associated with the second hand have different pay rates.

10. The method of claim 1, wherein dealing n cards of the first hand and drawing one or more cards to complete the first hand to have n cards comprises dealing and drawing cards from a first deck of cards, and wherein drawing one or more cards to complete the second hand to n cards comprises drawing cards from a second deck of cards different from the first deck of cards, the second deck of cards having a random ordering determined independently of a random ordering determined for the first deck of cards.

11. The method of claim 1, wherein dealing n cards of the first hand and drawing one or more cards to complete the first hand to have n cards comprises dealing and drawing cards from a first deck of cards, and wherein drawing one or more cards to complete the second hand to have n cards comprises drawing cards from the first deck of cards.

12. The method of claim 1, wherein n is five.

13. The method of claim 1, in which the at least one computer is configured to determine a payout for each of the final first hand and final second hand only when both the final first and final second hand are winning hands.

14. The method of claim 1, wherein the at least one computer is configured to:

cause a payout to be paid only for one of the final first hand and final second hand when the final first hand and the final second hand comprise the same winning cards.

15. A nontransitory, computer-readable memory having instructions stored thereon that when executed by at least one processor of at least one computer direct the at least one processor to:

deal "n" cards of a first hand, in which the act of dealing comprises causing indicia of the "n" cards of the first hand to be displayed at an interface of an electronic display device in electronic communication with the at least one computer;

receive a first selection from a player via an input device of the at least one computer, the first selection indicating that one of:

a) one or more of the n cards of the first hand are to be held; and b) none of the n cards of the first hand are to be held, wherein any card not selected to be held is discarded from the first hand;

responsive to one or more cards are discarded from the first hand, draw one or more cards to complete the first hand to have n cards to form a final first hand, in which the act of drawing one or more cards to complete the first hand comprises causing indicia of the drawn one or more cards to be displayed in the final first hand at the interface of the electronic display device;

automatically without receiving a further selection of cards, duplicate every card in the final first hand of n cards to a second hand of n cards regardless of whether or not the final first hand is a winning hand or a losing hand, in which the act of duplicating every card in the final first hand comprises causing the final first hand and a second hand comprising cards identical to the cards of the final first hand to be displayed at the interface of the electronic display device;

receive a second selection from the player via the input device, the second selection indicating that one of:

a) one or more of the n cards of the second hand are to be held; and b) none of the n cards of the second hand are to be held, wherein any card not selected to be held is discarded from the second hand;

responsive to one or more cards are discarded from the second hand, draw one or more cards to complete the second hand to have n cards to form a final second hand, in which the act of drawing one or more cards to complete the second hand comprises causing indicia of the drawn one or more cards to be displayed in the final second hand at the interface of the electronic display device;

determine whether the final first hand is a winning hand or a losing hand;

determine whether the final second hand is a winning hand or a losing hand, in which at least one wager amount wagered by the player in connection with the final first hand and the final second hand is stored in an electronic account prior to the act of determining whether the final second hand is a winning hand or losing hand, and if it is determined that at least one of the first hand and the second hand is a losing hand, cause the at least one wager amount wagered by the player to be surrendered;

if it is determined that each and every final hand including the final first hand and the final second hand is a winning hand, cause a payout payment to be paid to an electronic account of the player, wherein when the final first hand and the final second hand comprise the same winning cards, a payout is paid only for one of the final first hand and final second hand.

16. The nontransitory, computer-readable memory of claim 15, wherein the instructions further direct the at least one processor to:

determine a payout for at least one of the final first hand and final second hand only when both the final first and final second hand are winning hands.

17. A nontransitory computer-readable medium having instructions stored thereon that, when executed by at least one processor of at least one computer, direct the at least one processor to:

deal "n" cards of a first hand, in which the act of dealing comprises causing indicia of the "n" cards of the first hand to be displayed at an interface of an electronic display device in electronic communication with the at least one computer;

receive a first selection from a player via an input device of the at least one computer, the first selection indicating that one of:

a) one or more of the n cards of the first hand are to be held; and b) none of the n cards of the first hand are to be held, wherein any card not selected to be held is discarded from the first hand;

responsive to one or more cards being discarded from the first hand, draw one or more cards to complete the first hand to have n cards to form a final first hand, in which the act of drawing one or more cards to complete the first hand comprises causing indicia of the drawn one or more cards to be displayed in the final first hand at the interface of the electronic display device;

provide an opportunity to select one or more cards of the final first hand to be duplicated to a second hand;

receive a second selection, the second selection indicating that none of the n cards of the final first hand are to be duplicated to the second hand;

responsive to the second selection, draw n cards to complete the second hand to have n cards;

receive a third selection, the third selection indicating that one of:

a) one or more of the n cards of the second hand as cards to be held; and b) none of the n cards of the second hand are to be held, wherein any card not selected to be held is discarded from the second hand;

when one or more cards are discarded from the second hand, draw one or more cards to complete the second hand to have n cards to form a final second hand, in which the act of drawing one or more cards to complete the second hand comprises causing indicia of the drawn one or more cards to be displayed in the final second hand at the interface of the electronic display device;

determine whether the final first hand is a winning hand or a losing hand;

determine whether the final second hand is a winning hand or a losing hand in which at least one wager amount wagered by the player in connection with the final first hand and the final second hand is stored in an electronic account prior to the act of determining whether the final second hand is a winning hand or a losing hand, and if it is determined that at least one of the first hand and the second hand is a losing hand, cause the at least one wager amount wagered by the player to be surrendered;

if it is determined that each and every final hand including the final first hand and the final second hand is a winning hand, cause a payout payment to be paid to an electronic account of the player.

18. An apparatus comprising:

at least one processor of at least one computer; and at least one memory having instructions stored thereon that, when executed by the at least one processor, configure the apparatus to:

deal "n" cards of a first hand, in which the act of dealing comprises causing indicia of the "n" cards of the first hand to be displayed at an interface of an electronic display device in electronic communication with the at least one computer;

receive a first selection from a player via an input device of the at least one computer, the first selection indicating that one of:

a) one or more of the n cards of the first hand are to be held; and b) none of the n cards of the first hand are to be held, wherein any card not selected to be held is discarded from the first hand;

responsive to one or more cards being discarded from the first hand, draw one or more cards to complete the first hand to have n cards to form a final first hand, in which the act of drawing one or more cards to complete the first hand comprises causing indicia of the drawn one or more cards to be displayed in the final first hand at the interface of the electronic display device;

automatically without receiving a further selection of cards, duplicate every card in the final first hand of n cards to a second hand of n cards regardless of whether or not the final first hand is a winning hand or a losing hand, in which the act of duplicating every card in the final first hand comprises causing the final first hand and a second hand comprising cards identical to the cards of the final first hand to be displayed at the interface of the electronic display device;

receive a second selection, the second selection indicating that one of:

a) one or more of the n cards of the second hand are to be held; and b) none of the n cards of the second hand are to be held, wherein any card not selected to be held is discarded from the second hand;

responsive to one or more cards being discarded from the second hand, draw one or more cards to complete the second hand to have n cards to form a final second hand, in which the act of drawing one or more cards to complete the second hand comprises causing indicia of the drawn one or more cards to be displayed in the final second hand at the interface of the electronic display device;

determine whether the final first hand is a winning hand or a losing hand;

determine whether the final second hand is a winning hand or a losing hand, in which at least one wager amount wagered by the player in connection with the final first hand and the final second hand is stored in an electronic account prior to the act of determining whether the final second hand is a winning hand or losing hand, and if it is determined that at least one of the first hand and the second hand is a losing hand, cause the at least one wager amount wagered by the player to be surrendered such that no payout is paid on the at least one wager;

if it is determined that each and every final hand including the final first hand and the final second hand is a winning hand, cause a payout payment to be paid to an electronic account of the player, wherein if the final first hand and the final second hand comprise the same winning cards, a payout is paid only for one of the final first hand and final second hand.

19. The apparatus of claim 18, wherein the final first hand has the same payout as the final second hand when the final first hand and the final second hand comprise the same cards.

20. The apparatus of claim 18, wherein the final first hand has a different payout from the final second hand when the final first hand and the final second hand comprise the same cards.

21. The apparatus of claim 20, wherein a payout for the first hand is higher than a payout for the second hand when the final first hand and the final second hand comprise the same cards.

22. The apparatus of claim 20, wherein a payout for the first hand is lower than a payout for the second hand when the final first hand and the final second hand comprise the same cards.

23. The apparatus of claim 18, wherein the instructions further configure the apparatus to:

duplicate the final second hand of n cards to a third hand of n cards;

receive a third selection, the third selection indicating that one of:

a) one or more of the n cards of the third hand are to be held; and b) none of the n cards of the third hand are to be held, wherein any card not selected to be held is discarded from the third hand;

when one or more cards are discarded from the third hand, draw cards to complete the third hand to have n cards to form a final third hand; and determine whether the final third hand is a winning hand or a losing hand; and cause a payout payment to be paid to an electronic account of the player only if the final first hand, the final second hand, and the final third hand are each winning hands.

24. The apparatus of claim 18, wherein a pay table is used to determine a payout for the first hand when the first hand is a winning hand, and wherein a pay table is used to determine a payout for the second hand when the second hand is a winning hand.

25. The apparatus of claim 24, wherein the pay table used to determine a payout for the first hand and the payout table used to determine a payout for the second hand have the same pay rates.

26. The apparatus of claim 24, wherein the pay table used to determine a payout for the first hand and the payout table used to determine a payout for the second hand have different pay rates.

27. The apparatus of claim 18, wherein dealing the first hand of n cards and drawing one or more cards to complete the first hand to have n cards comprises dealing and drawing cards from a first deck of cards, and wherein drawing one or more cards to complete the second hand to n cards comprises drawing cards from a second deck of cards different from the first deck of cards.

28. The apparatus of claim 18, wherein dealing the first hand of n cards and drawing one or more cards to complete the first hand to have n cards comprises dealing and drawing cards from a first deck of cards, and wherein drawing one or more cards to complete the second hand to have n cards comprises drawing cards from the first deck of cards.

29. The apparatus of claim 18, wherein n is five.

30. The method of claim 18, wherein the instructions further configure the apparatus to:

determine a payout for at least one of the final first hand and final second hand only when both the final first and final second hand are winning hands.

* * * * *